United States Patent
Inoue et al.

(10) Patent No.: US 11,703,462 B2
(45) Date of Patent: Jul. 18, 2023

(54) WATER VAPOR OBSERVATION DEVICE, WATER VAPOR OBSERVATION SYSTEM, WATER VAPOR OBSERVATION METHOD, AND RECORDING MEDIUM

(71) Applicant: FURUNO ELECTRIC CO., LTD., Hyogo (JP)

(72) Inventors: Shuhei Inoue, Hyogo (JP); Taiki Iwahori, Hyogo (JP)

(73) Assignee: FURUNO ELECTRIC CO., LTD., Hyogo (JP)

( * ) Notice: Subject to any disclaimer, the term of this patent is extended or adjusted under 35 U.S.C. 154(b) by 0 days.

(21) Appl. No.: 17/849,716

(22) Filed: Jun. 27, 2022

(65) Prior Publication Data

US 2022/0326164 A1 Oct. 13, 2022

Related U.S. Application Data

(63) Continuation of application No. PCT/JP2021/000792, filed on Jan. 13, 2021.

(30) Foreign Application Priority Data

Feb. 14, 2020 (JP) .................. 2020-022949

(51) Int. Cl.
*G01N 22/00* (2006.01)
*G01W 1/02* (2006.01)

(52) U.S. Cl.
CPC .............. *G01N 22/00* (2013.01); *G01W 1/02* (2013.01)

(58) Field of Classification Search
CPC .... G01N 22/00; G01N 22/04; G01N 21/3554; G01N 33/18; G01N 1/2273;
(Continued)

(56) References Cited

U.S. PATENT DOCUMENTS 10,502,696 B2 * 12/2019 Minowa .................. G01N 22/04
2018/0024214 A1 * 1/2018 Bhat .................. G01R 33/5611
324/309
(Continued)

FOREIGN PATENT DOCUMENTS

CN 105453340 B * 6/2018 ............. G01C 5/005
JP 6099318 3/2017
(Continued)

OTHER PUBLICATIONS

"International Search Report (Form PCT/ISA/210) of PCT/JP2021/000792", dated Mar. 16, 2021, with English translation thereof, pp. 1-4.

*Primary Examiner* — Jeffrey P Aiello
(74) *Attorney, Agent, or Firm* — JCIPRNET

(57) ABSTRACT

This water vapor observation device comprises an antenna, an RF amplifier, and processing circuitry. The antenna receives radio waves radiated from an atmosphere including water vapor. The RF amplifier amplifies the received radio waves and generates an observation signal. The processing circuitry is programmed to at least: use the observation signal to select a plurality of observation frequencies excluding an accuracy degraded frequency; and calculate a water vapor index using the spectral intensities of the plurality of observation frequencies. This configuration makes it possible to accurately observe a water vapor amount.

20 Claims, 24 Drawing Sheets

(58) Field of Classification Search
CPC ... G01N 2021/354; G01S 13/95; G01S 17/95; G01S 19/14; G01W 1/11; G01W 1/02; G01W 1/00; G01W 1/10; Y02A 90/10; E03B 3/28
USPC .............. 702/1–3, 23–24, 32, 49, 76, 172, 702/188–189
See application file for complete search history.

(56) References Cited

U.S. PATENT DOCUMENTS

2018/0209919 A1* 7/2018 Minowa ................. G01W 1/00
2018/0209920 A1* 7/2018 Minowa ............... G01S 13/951

FOREIGN PATENT DOCUMENTS

WO       2017018062     2/2017
WO    WO-2017018061 A1 * 2/2017 ............. G01N 22/04

\* cited by examiner

WATER VAPOR OBSERVATION DEVICE, WATER VAPOR OBSERVATION SYSTEM, WATER VAPOR OBSERVATION METHOD, AND RECORDING MEDIUM

CROSS-REFERENCE TO RELATED APPLICATION

The present application is a continuation of PCT/JP2021/000792, filed on Jan. 13, 2021, and is related to and claims priority from Japanese patent application no. 2020-022949, filed on Feb. 14, 2020. The entire contents of the aforementioned application are hereby incorporated by reference herein.

TECHNICAL FIELD

The disclosure relates to a technique for observing water vapor.

BACKGROUND

Radio waves generated from water vapor are used, the signal intensity of the observation target is low, and it is difficult to accurately observe the amount of water vapor.

Therefore, the purpose of the disclosure relates to accurately observing the amount of water vapor.

SUMMARY

A water vapor observation device according to the disclosure includes an antenna, an RF amplifier, and processing circuitry. The antenna receives radio waves radiated from an atmosphere including water vapor. The RF amplifier amplifies the received radio waves and generates an observation signal. The processing circuitry is programmed to at least: select a plurality of observation frequencies excluding an accuracy degraded frequency based on the observation signal; and calculate a water vapor index by using the spectral intensities of the plurality of observation frequencies.

With this configuration, the spectral intensities of the plurality of observation frequencies required for calculating the water vapor index can be obtained with high accuracy.

According to the disclosure, the amount of water vapor can be observed accurately.

BRIEF DESCRIPTION OF DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

Figure 15:
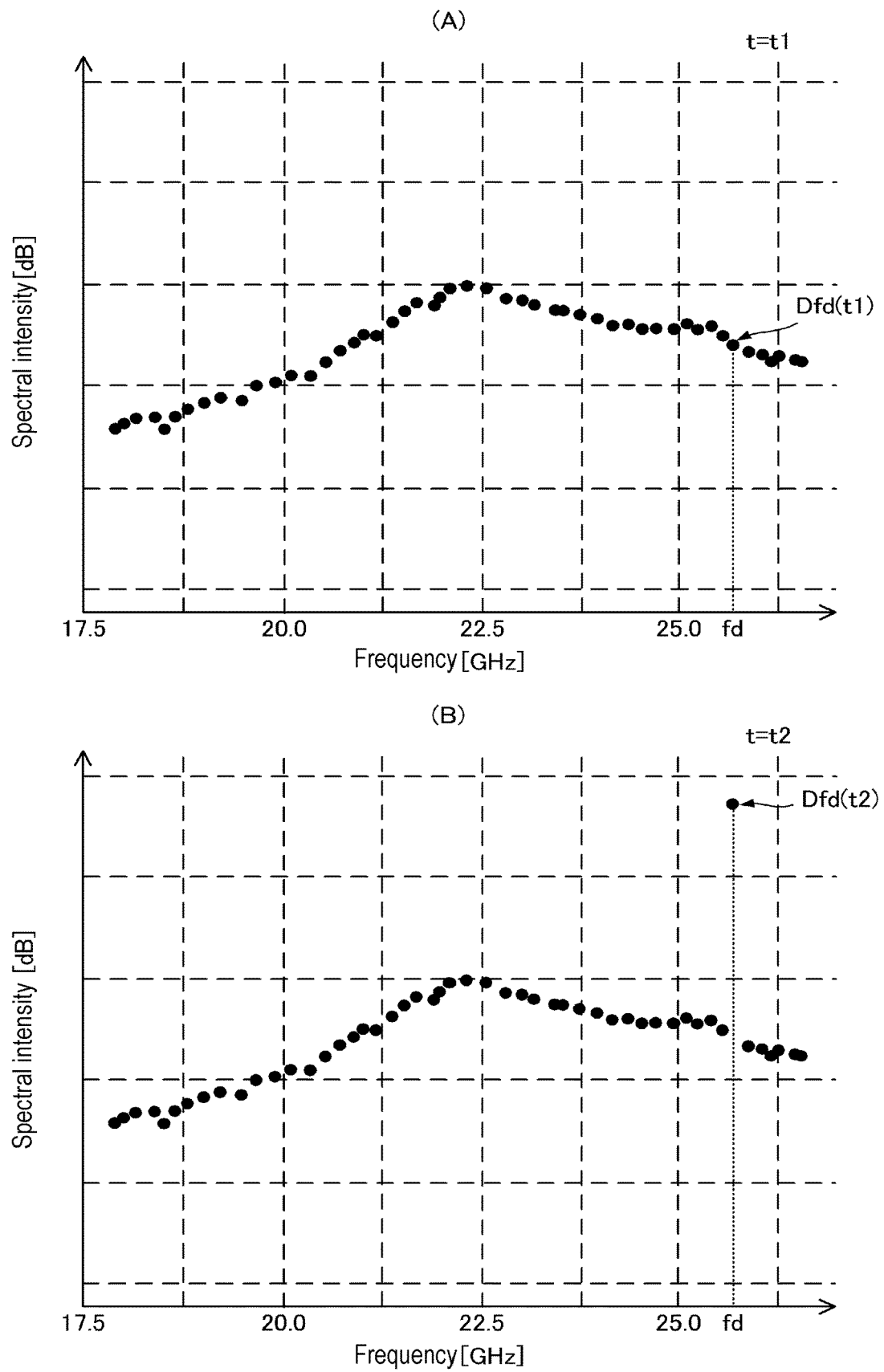

(A) of FIG. 15 and (B) of FIG. 15 are spectral characteristic diagrams illustrating the detection concept of the fifth detection method for an abnormal value.

Figure 16:
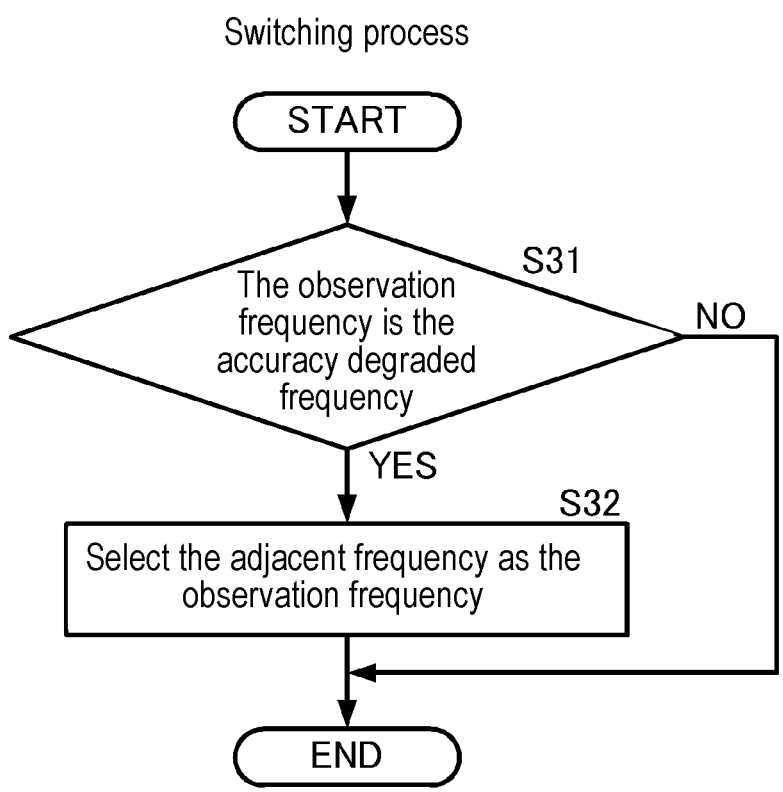

FIG. 16 is a flowchart showing the switching method of the observation frequency.

Figure 17:
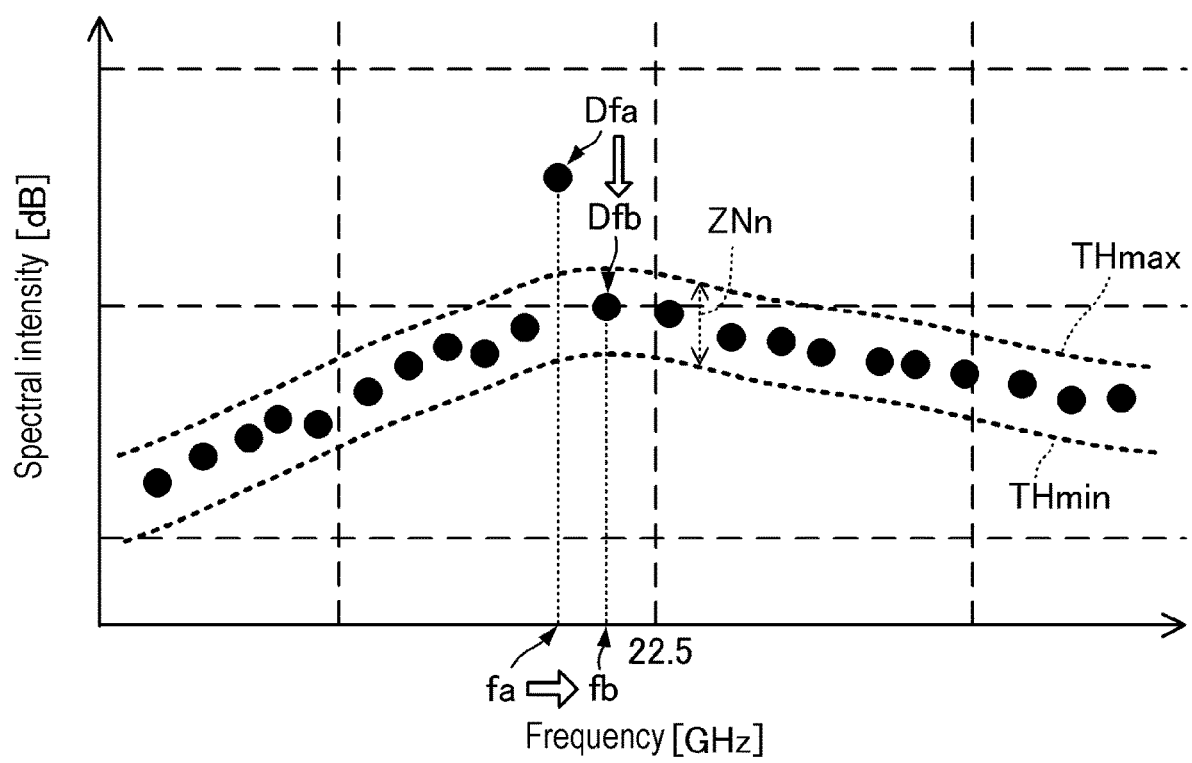

FIG. 17 is a spectral characteristic diagram illustrating the concept of the switching method of the observation frequency.

Figure 18:
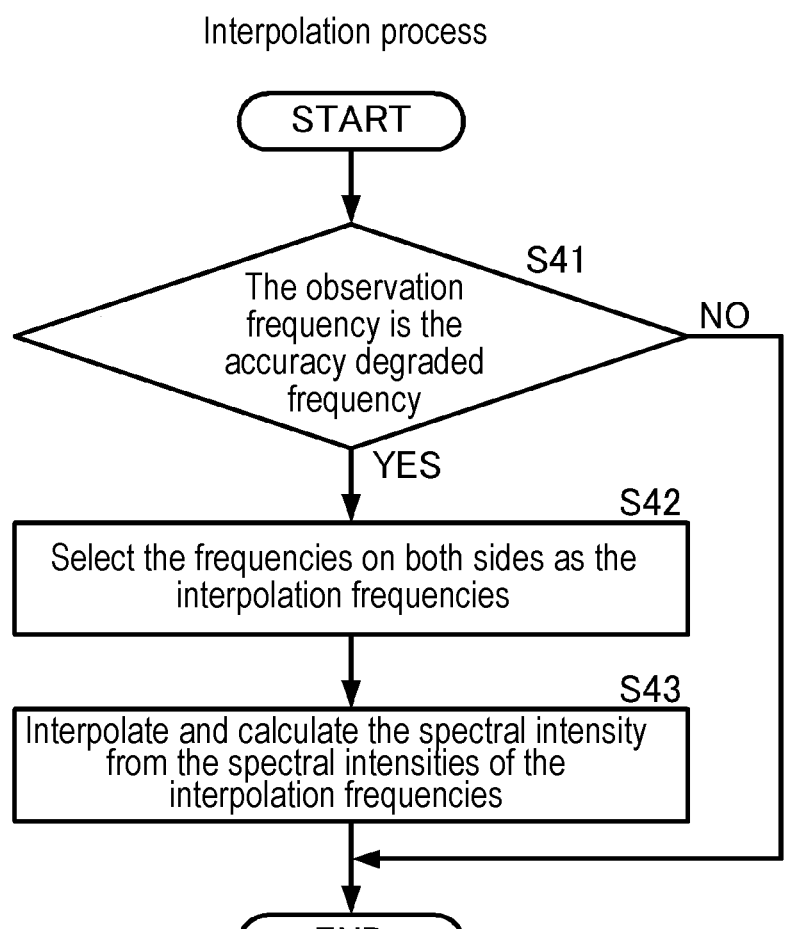

FIG. 18 is a flowchart showing the interpolation method of the spectral intensity of the observation frequency.

Figure 19:
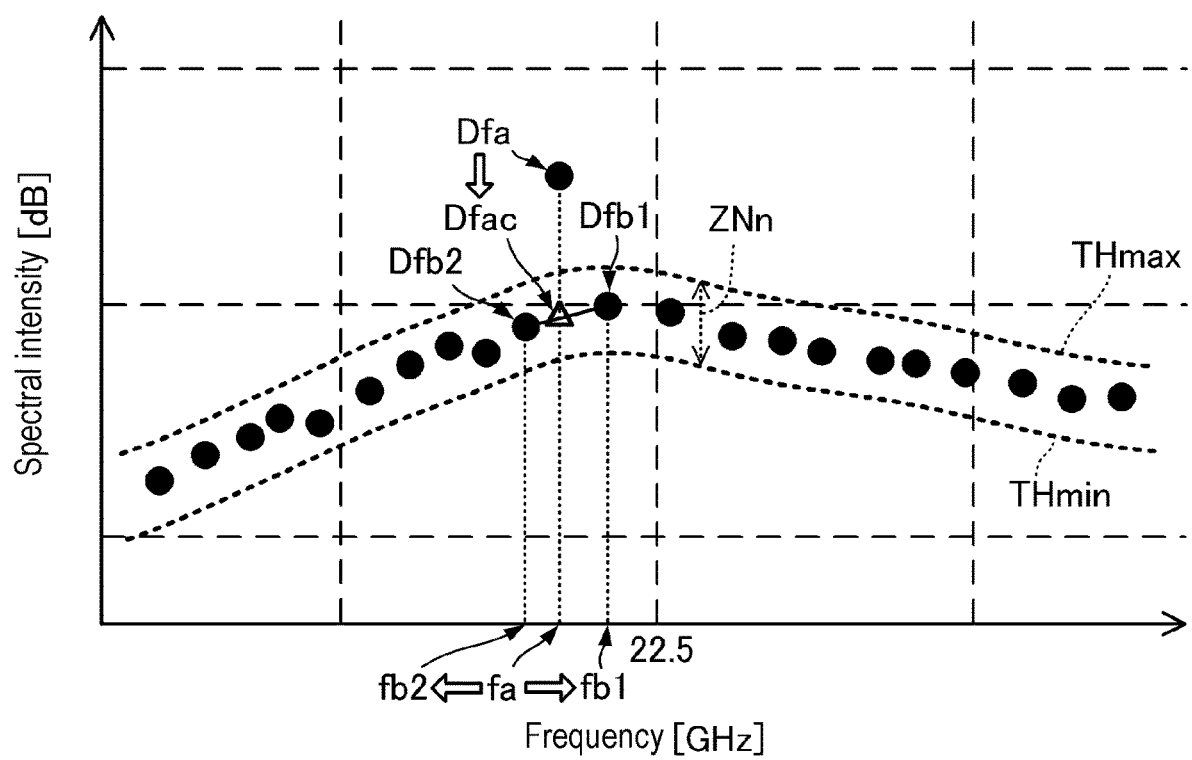

FIG. 19 is a spectral characteristic diagram illustrating the concept of the interpolation method of the spectral intensity of the observation frequency.

Figure 20:
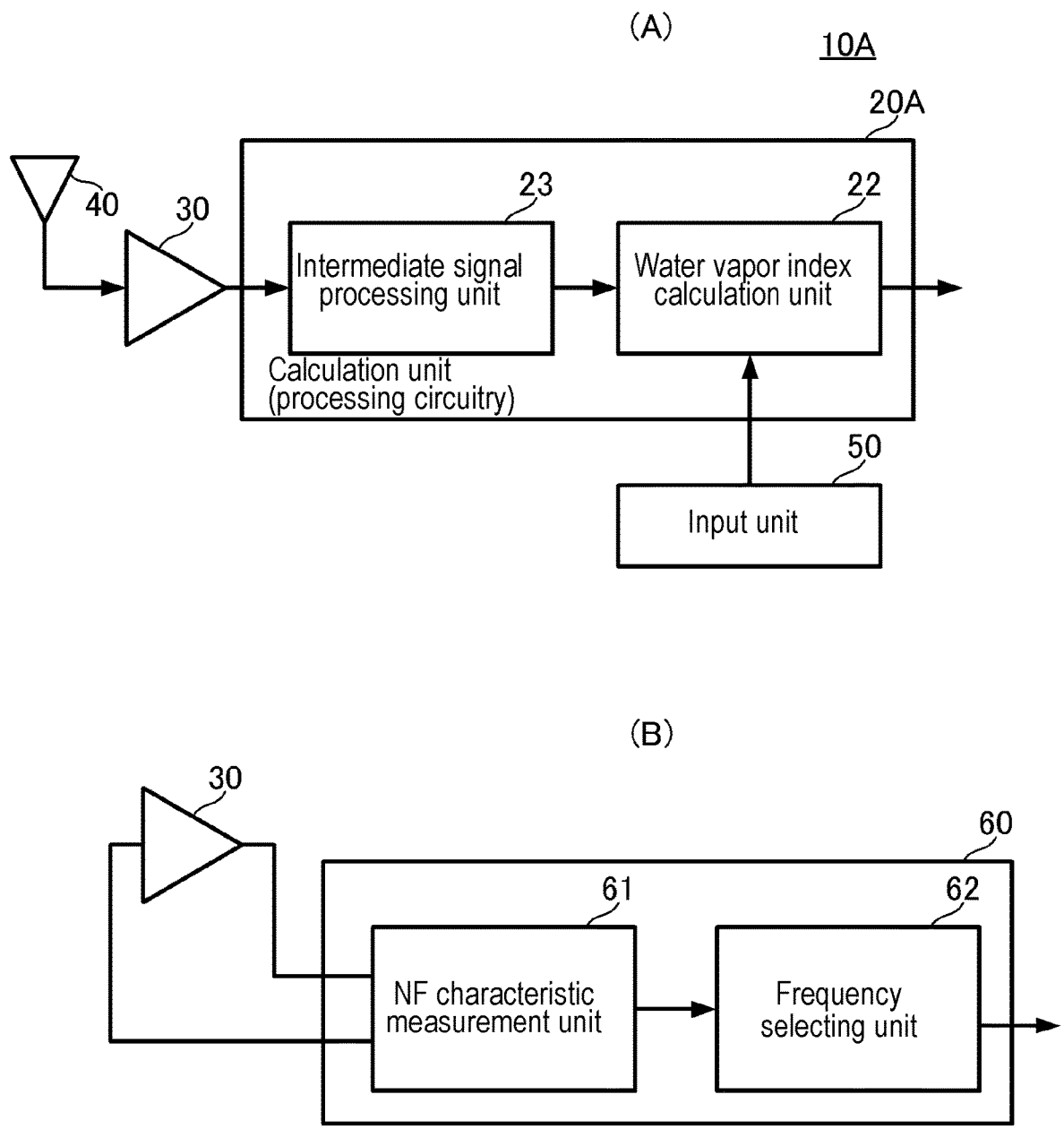

(A) of FIG. 20 is a functional block diagram showing the configuration of the water vapor observation device in the water vapor observation system according to the second embodiment of the disclosure, and (B) of FIG. 20 is a functional block diagram showing the configuration of the observation frequency selecting device of the water vapor observation system according to the second embodiment of the disclosure.

Figure 21:
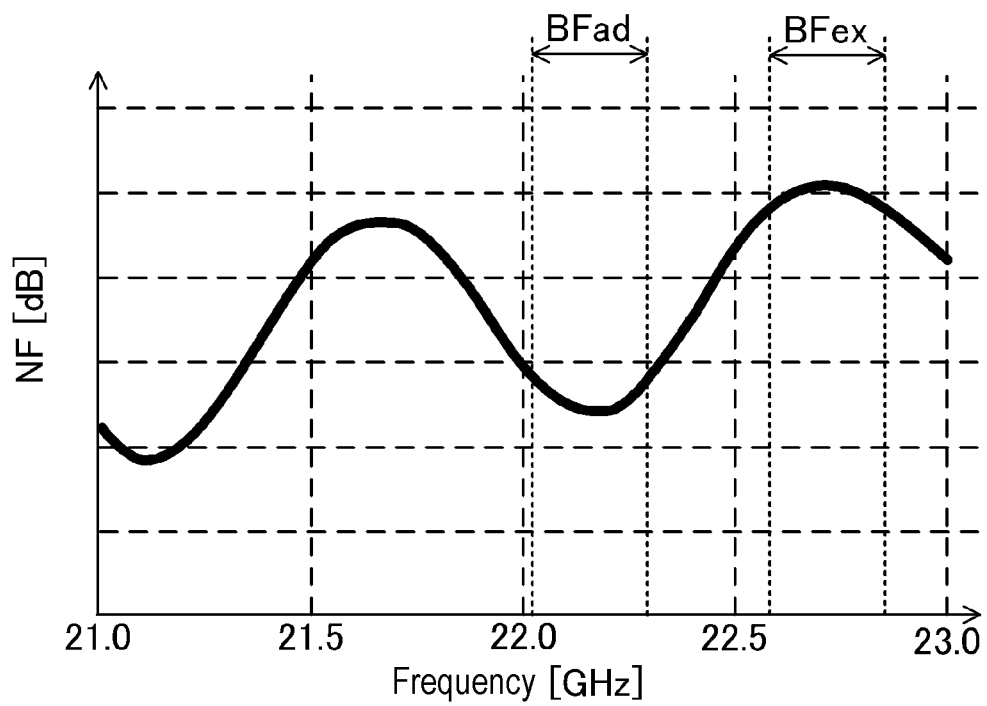

FIG. 21 is a graph showing an example of the NF characteristic of the RF amplifier.

Figure 22:
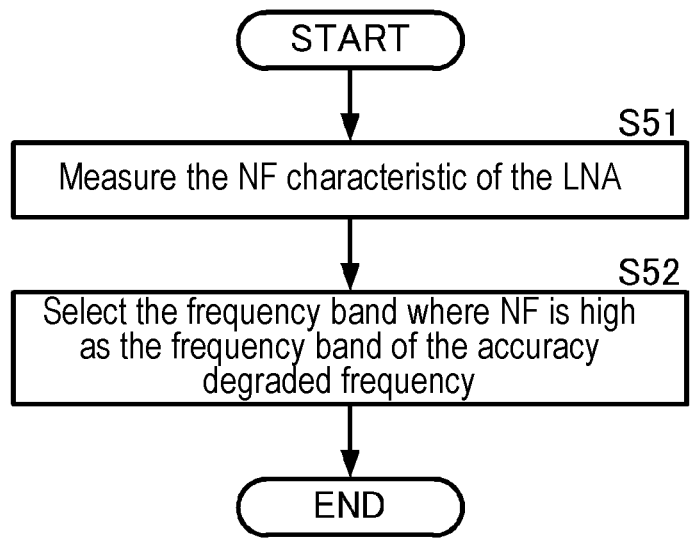

FIG. 22 is a flowchart of the accuracy degraded frequency process.

Figure 23:
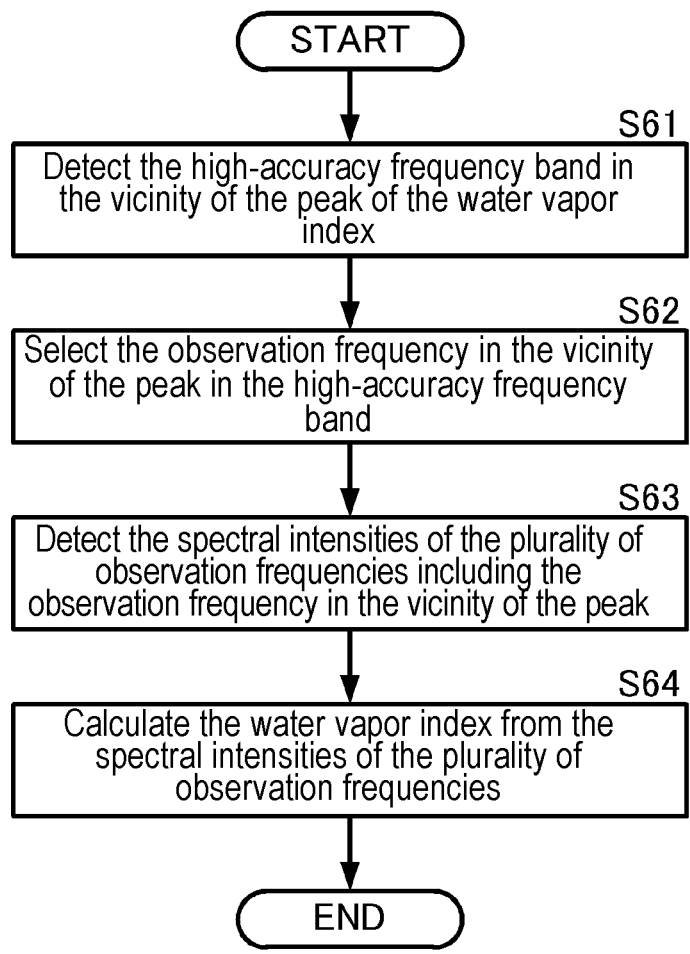

FIG. 23 is a flowchart of the water vapor observation process.

Figure 24:
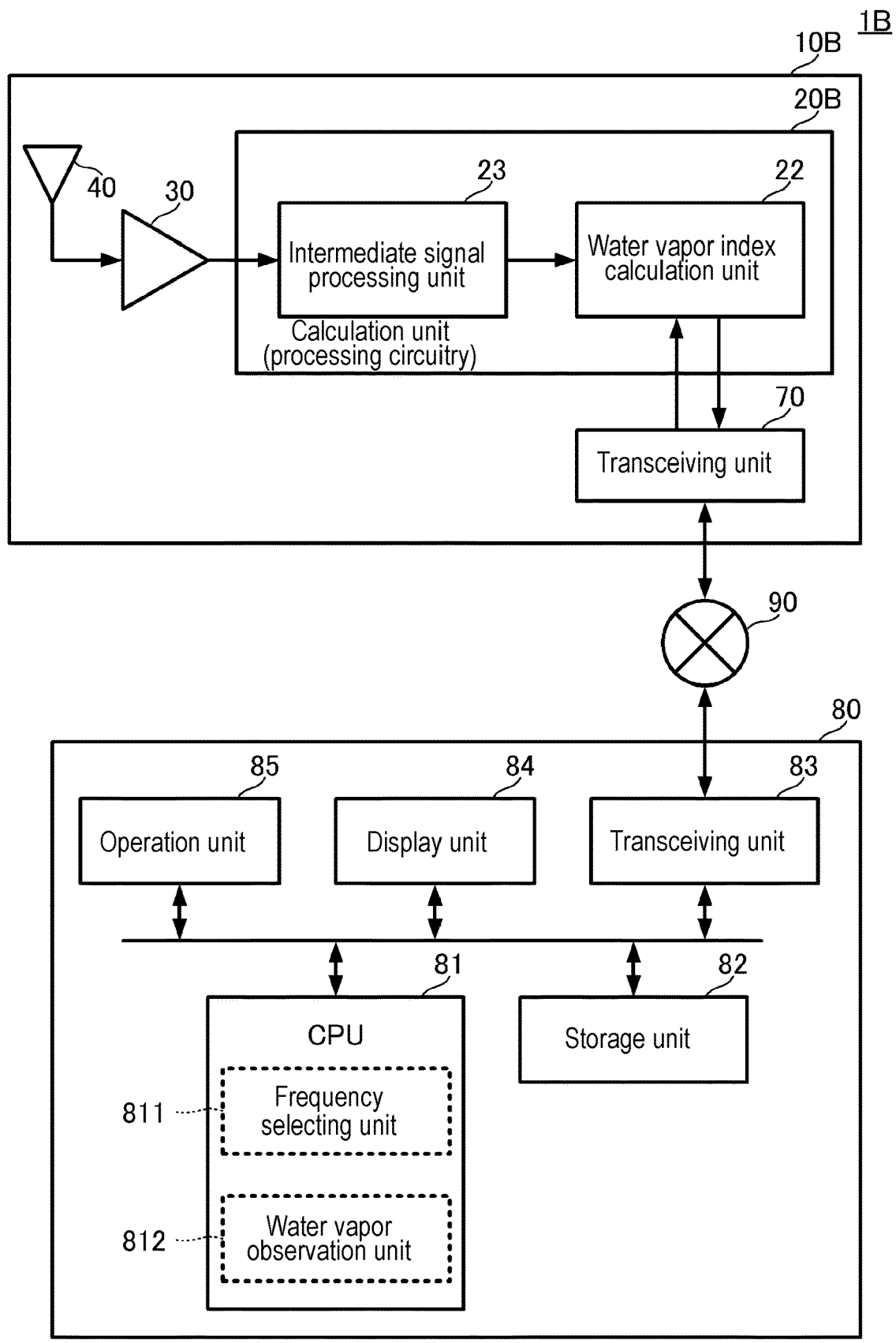

FIG. 24 is a functional block diagram showing the configuration of the water vapor observation system according to the third embodiment.

Figure 25:
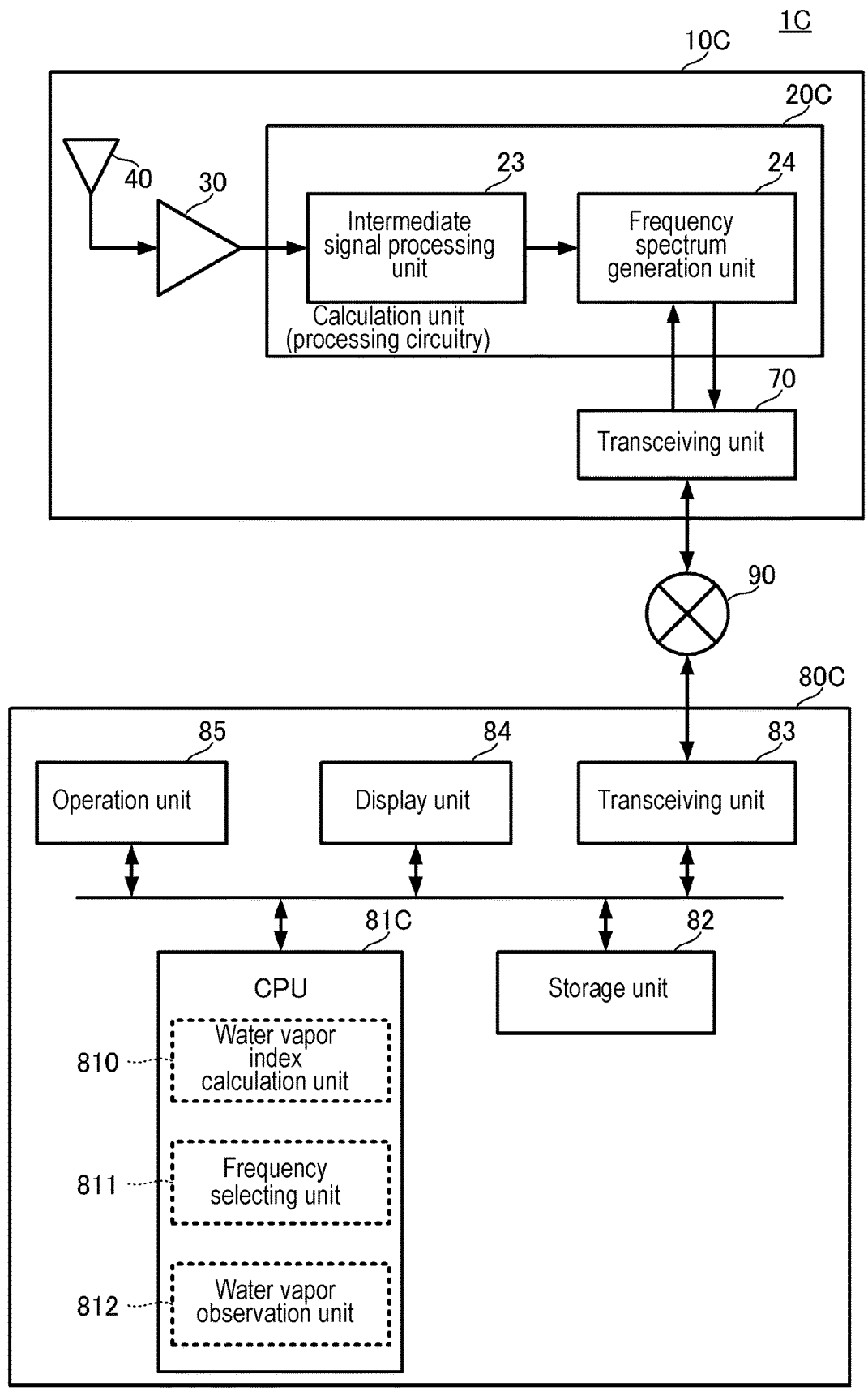

FIG. 25 is a functional block diagram showing the configuration of the water vapor observation system according to the fourth embodiment.

DESCRIPTION OF EMBODIMENTS

First Embodiment

Figure 1:
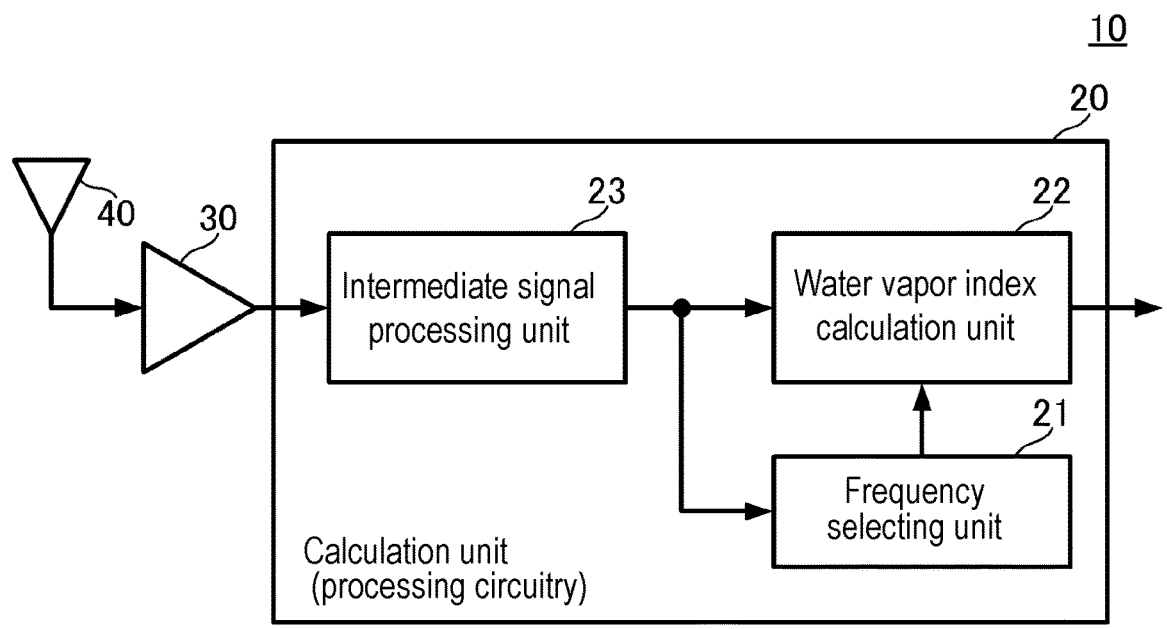
FIG. 1 is a functional block diagram showing the configuration of the water vapor observation device according to the first embodiment of the disclosure.
Figure 2:
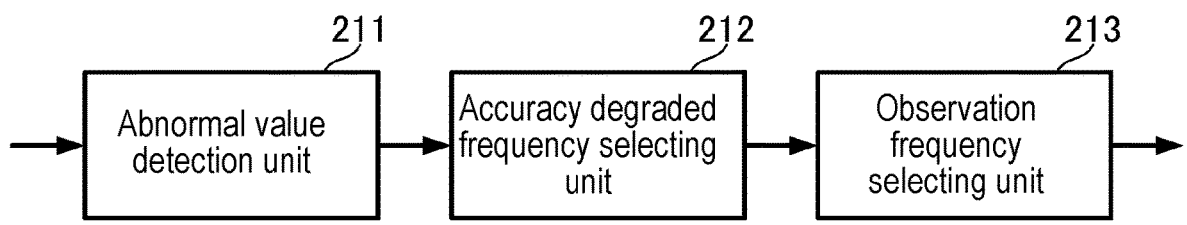
FIG. 2 is a functional block diagram showing the configuration of the frequency selecting unit.

A water vapor observation device, a water vapor observation method, and a water vapor observation program according to the first embodiment of the disclosure will be described with reference to the drawings. FIG. 1 is a functional block diagram showing the configuration of the water vapor observation device according to the first embodiment of the disclosure. FIG. 2 is a functional block diagram showing the configuration of a frequency selecting unit.

Water Vapor Observation Device 10

As shown in FIG. 1, the water vapor observation device 10 includes a calculation unit 20, an RF amplifier 30, and an antenna 40. The antenna 40 is connected to the RF amplifier 30, and the RF amplifier 30 is connected to the calculation unit 20.

The antenna 40 has a particular sensitivity to a high frequency signal (RF signal) in a gigahertz band (GHz band). The antenna 40 receives a high frequency signal radiated from the atmosphere and outputs the received high frequency signal to the RF amplifier 30. The high frequency signal radiated from the atmosphere includes radio waves radiated from water vapor. The frequency spectrum of water vapor has characteristics corresponding to the state of water vapor, such as the amount of water vapor.

The RF amplifier 30 is a so-called LNA (low noise amplifier), and has a particular amplification characteristic for the high frequency signal in the gigahertz band. The RF amplifier 30 is realized by a particular electronic circuit. The RF amplifier 30 amplifies the high frequency signal input from the antenna 40 and outputs the amplified high frequency signal as an observation signal in an RF band.

The calculation unit 20 is realized by processing circuitry, a particular electronic circuit, a calculation processing device such as a computer, an IC or the like. The calculation unit 20 includes a frequency selecting unit 21, a water vapor index calculation unit 22, and an intermediate signal processing unit 23.

The intermediate signal processing unit 23 includes a down converter, an IF amplifier, and the like. The observation signal in the RF band is input to the intermediate signal processing unit 23.

The intermediate signal processing unit 23 down-converts the observation signal in the RF band to an IF band, amplifies the observation signal in the IF band, and outputs the observation signal after these processes. At this time, the intermediate signal processing unit 23 may include a filter circuit and perform a filter process on the observation signal after down-conversion. In this case, for example, the intermediate signal processing unit 23 performs the filter process so as to suppress frequency components other than the frequency band required for water vapor observation.

As shown in FIG. 2, the frequency selecting unit 21 includes an abnormal value detection unit 211, an accuracy degraded frequency selecting unit 212, and an observation frequency selecting unit 213.

The observation signal from the intermediate signal processing unit 23 is input to the abnormal value detection unit 211. The abnormal value detection unit 211 detects an abnormal value in the frequency spectrum of the observation signal. An example of a specific method of detecting the abnormal value will be described later. Here, in the disclosure, the abnormal value in the frequency spectrum of the observation signal is not caused by the water vapor of the observation target, but is caused by the configuration, specifications, and external radio wave environment of the device, that is, the observation environment. For example, when an inexpensive RF amplifier 30 is used in order to reduce the cost of the device, the amplification rate of the RF amplifier 30 may fluctuate due to temperature, individual difference, etc., or the amplification rate may differ for each frequency. In such a case, an abnormal value occurs. Further, the frequency of the water vapor spectrum may overlap the frequency band of a specific communication system such as 5G. Therefore, if a communication signal of this communication system is included in the observation signal, an abnormal value is generated.

The accuracy degraded frequency selecting unit 212 selects the frequency of the abnormal value as an accuracy degraded frequency.

The observation frequency selecting unit 213 selects a plurality of observation frequencies other than the accuracy degraded frequency from the accuracy degraded frequency. An example of a specific method of selecting the plurality of observation frequencies will be described later. The frequency selecting unit 21 outputs the plurality of observation frequencies to the water vapor index calculation unit 22.

The observation signal is input to the water vapor index calculation unit 22. The water vapor index calculation unit 22 detects the spectral intensities of the plurality of observation frequencies selected by the frequency selecting unit 21 from the observation signal. The water vapor index calculation unit 22 calculates a water vapor index having a high correlation with the amount of water vapor from the spectral intensities of the plurality of observation frequencies.

Example of Calculating the Water Vapor Index

Figure 3:
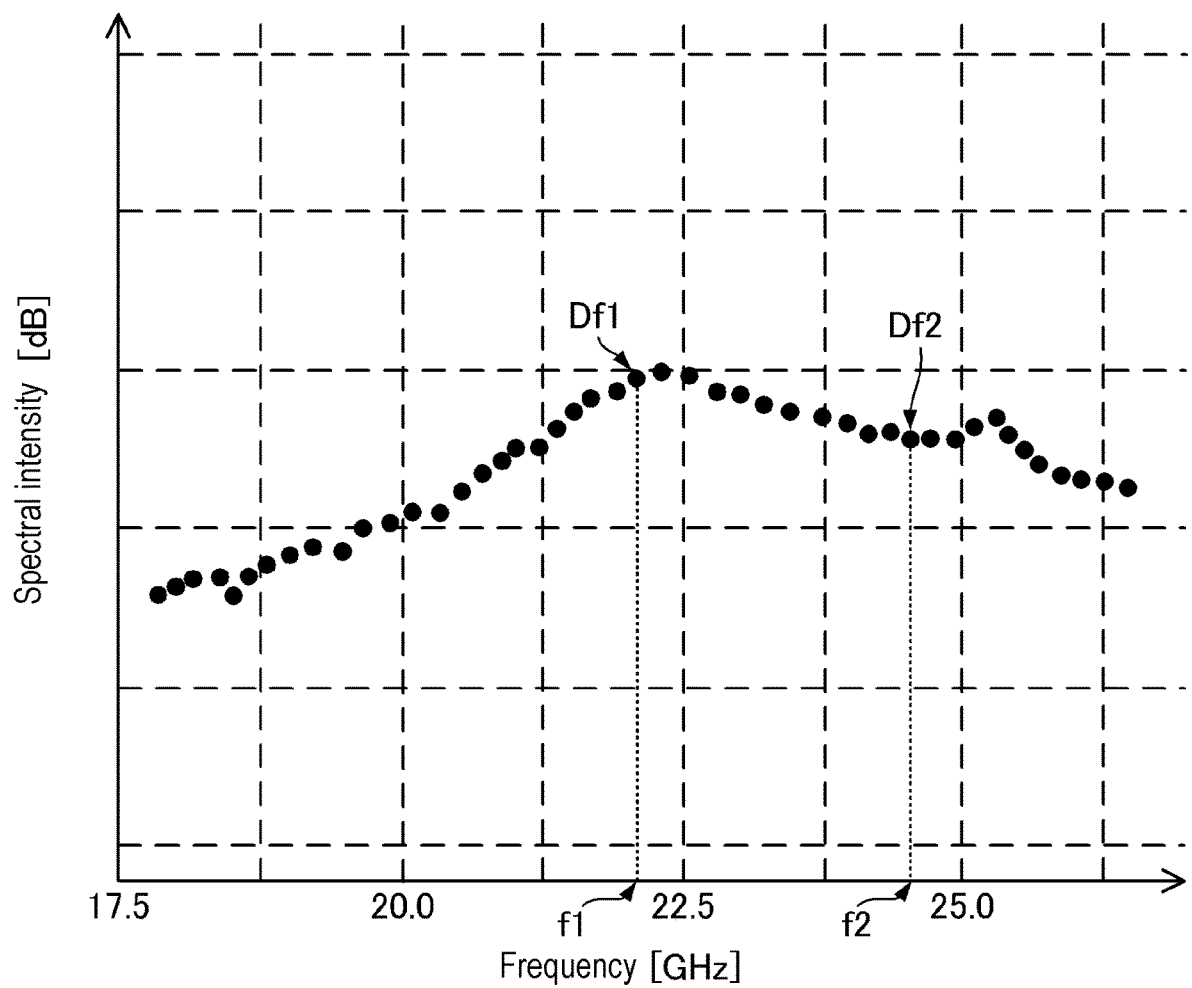
FIG. 3 is a diagram showing the concept of an example of calculation of the water vapor index.

FIG. 3 is a diagram showing the concept of an example of calculation of the water vapor index. The observation frequency selecting unit 213 selects an observation frequency f1 and an observation frequency f2 as the plurality of observation frequencies. For example, the observation frequency f1 is generally selected in the vicinity of the peak frequency of the frequency spectrum of water vapor (for example, in the vicinity of about 22 GHz). Further, for example, the observation frequency f2 is selected to be a frequency higher than the observation frequency f1.

Nevertheless, the selection of the observation frequency f1 and the observation frequency f2 is not limited thereto. The observation frequency f1 may be a frequency higher than the observation frequency f2. Further, the observation frequency f1 and the observation frequency f2 can be appropriately selected according to the calculation method of the water vapor index.

The water vapor index calculation unit 22 detects a spectral intensity Df1 of the observation frequency f1 and a spectral intensity Df2 of the observation frequency f2. The water vapor index calculation unit 22 calculates the water vapor index by using the spectral intensity Df1 and the spectral intensity Df2.

It is known that, for example, when the spectral intensity Df1 of the observation frequency f1 and the spectral intensity Df2 of the observation frequency f2 respectively set as described above are used, the water vapor index having a high correlation with the amount of water vapor can be obtained according to the applicant's past invention (see, for example, the specification of US Patent Application Publication No. 2014/0035779). With use of this content, the water vapor index calculation unit 22 calculates the water vapor index by using the spectral intensity Df1 and the spectral intensity Df2.

Effect of the Configuration of the Water Vapor Observation Device 10

With the above configuration, the water vapor observation device 10 detects the accuracy degraded frequency and selects the plurality of observation frequencies excluding the accuracy degraded frequency. Accordingly, the water vapor observation device 10 can detect the spectral intensities of the plurality of observation frequencies that accurately reflect the amount of water vapor. Then, the water vapor observation device 10 can calculate the water vapor index by using these spectral intensities to accurately calculate the water vapor index. Then, by using the water vapor index accurately calculated, for example, the water vapor observation device 10 can accurately observe the amount of water vapor, etc.

Water Vapor Observation Method According to the First Embodiment

Figure 4:
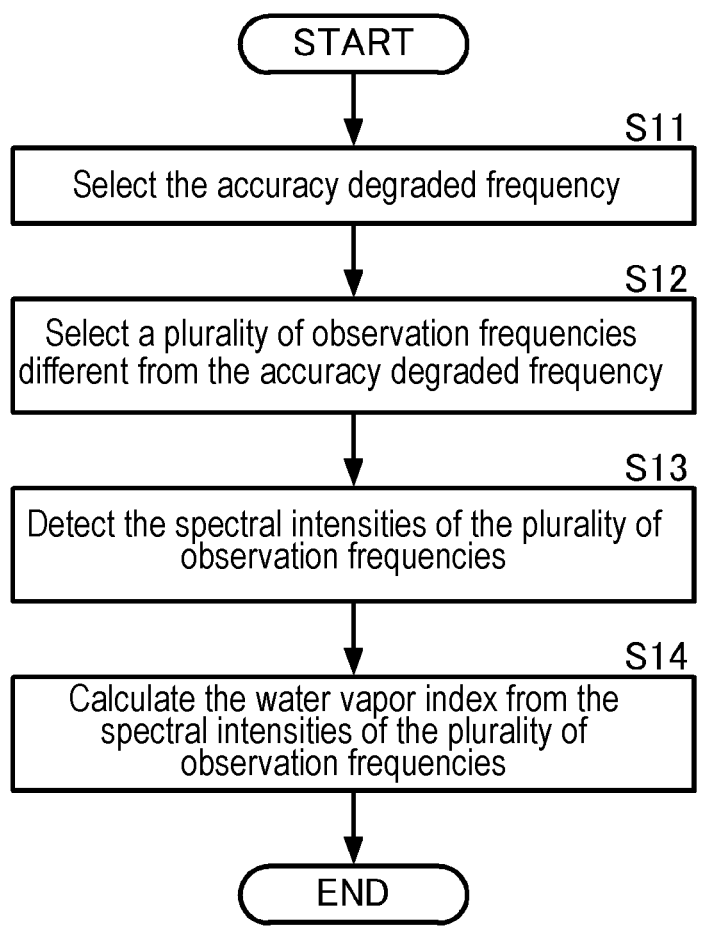
FIG. 4 is a flowchart of the water vapor index calculation process.
Figure 5:
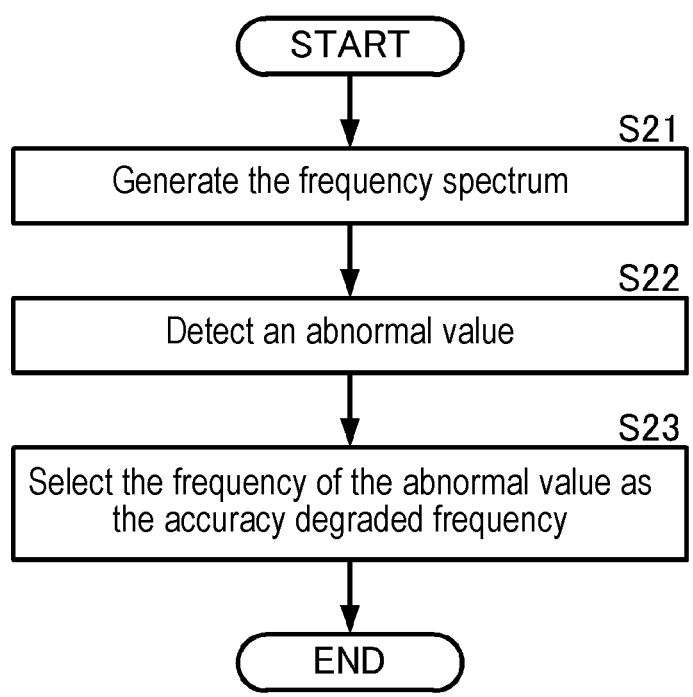
FIG. 5 is a flowchart of the process of selecting the accuracy degraded frequency.

In the above description, a mode is shown in which the processes of water vapor observation are respectively executed by functional units for different processes. However, the processing in the calculation unit 20 described above may be programmed and stored in a storage medium or the like, and the program may be executed by a calculation processing device to realize the above-mentioned water vapor observation. In this case, the calculation processing device may execute the processing according to the flowcharts shown in FIG. 4 and FIG. 5, for example. FIG. 4 is a flowchart of a water vapor index calculation process. FIG. 5 is a flowchart of a process of selecting the accuracy degraded frequency.

The calculation processing device uses the observation signal to select the accuracy degraded frequency (S11). More specifically, the calculation processing device generates the frequency spectrum of the observation signal (S21). The calculation processing device detects an abnormal value of the spectral intensity from the frequency spectrum (S22). The calculation processing device selects the frequency of the abnormal value as the accuracy degraded frequency (S23).

The calculation processing device selects a plurality of observation frequencies different from the accuracy degraded frequency (S12). The calculation processing device detects the spectral intensities of the plurality of observation frequencies from the observation signal (S13). The calculation processing device calculates the water vapor index from the spectral intensities of the plurality of observation frequencies (S14).

Example of the Specific Method of Detecting the Abnormal Value

In the water vapor observation device 10 of the disclosure, a plurality of methods shown hereinafter can be used for detecting the abnormal value. Therefore, in the following, the abnormal value detection methods will be described in order. These abnormal value detection methods may be performed independently, or the abnormal value may be detected from the result of combining a plurality of methods.

Figure 6:
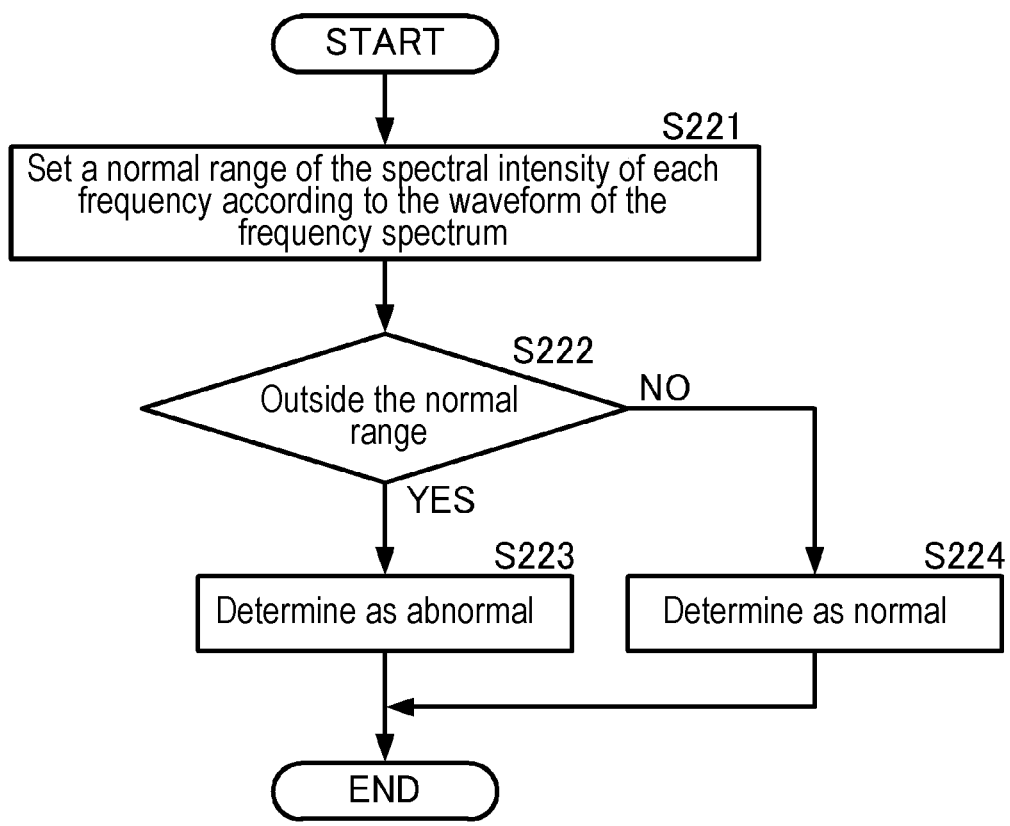
FIG. 6 is a flowchart showing the main processing in the abnormal value detection method.

FIG. 6 is a flowchart showing the main processing in the abnormal value detection method. Hereinafter, the abnormal value detection unit 211 will be mainly described, but when the abnormal value detection process is programmed, the calculation processing device executes this process.

The abnormal value detection unit 211 sets a normal range (normal range of each frequency) of the spectral intensity of each frequency according to the waveform of the frequency spectrum of the observation signal (S221). The abnormal value detection unit 211 determines whether the spectral intensity of each frequency is within the normal range or outside the normal range by using the normal range of each frequency.

The abnormal value detection unit 211 determines that the spectral intensity of the frequency is an abnormal value (S223) if the spectral intensity is outside the normal range (S222: YES). Then, the accuracy degraded frequency selecting unit 212 selects the frequency detected as the abnormal value as the accuracy degraded frequency.

The abnormal value detection unit 221 determines that the spectral intensity of the frequency is a normal value (S224) if the spectral intensity is within the normal range (S222: NO).

First Detection Method

Figure 7:
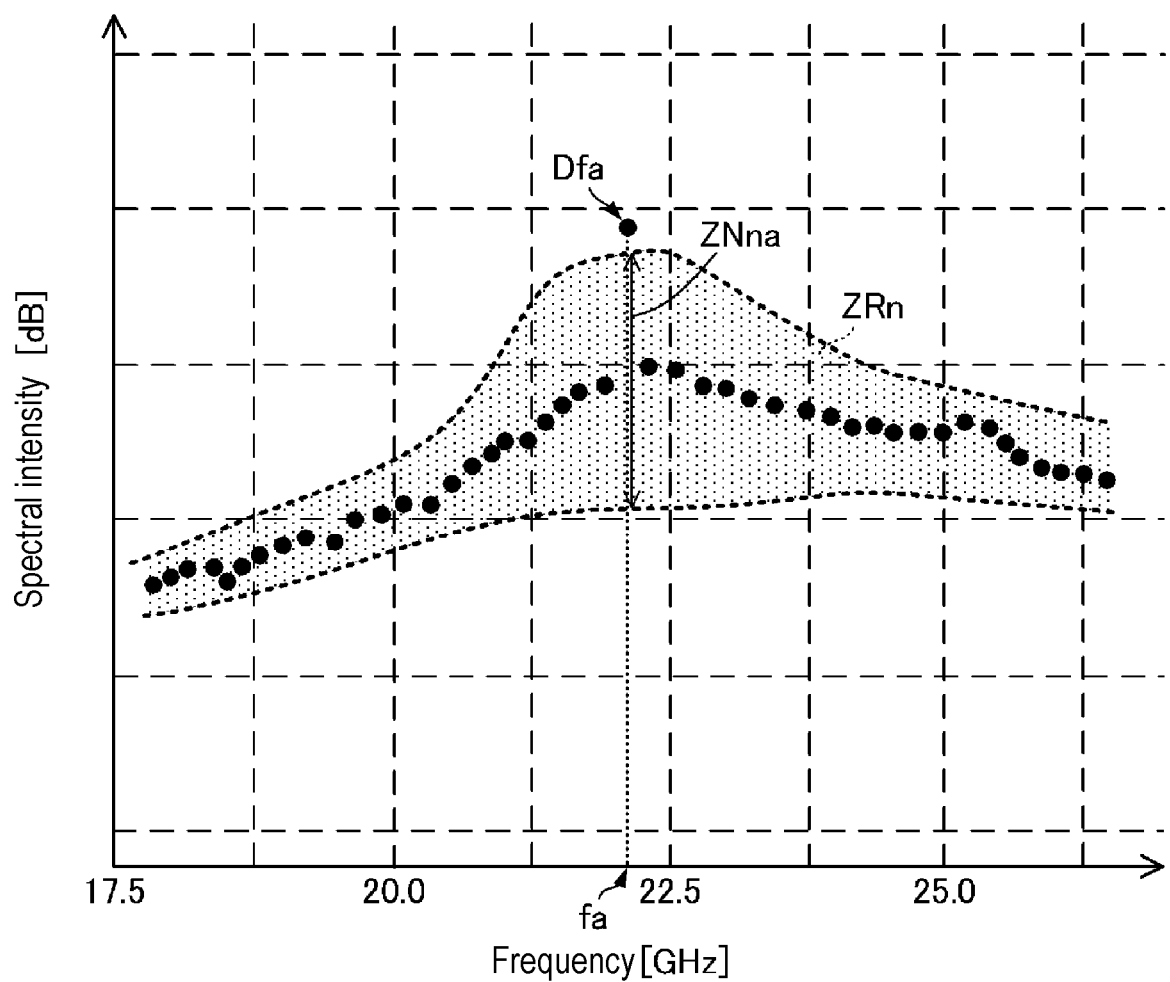
FIG. 7 is a spectral characteristic diagram illustrating the detection concept of the first detection method for an abnormal value.

FIG. 7 is a spectral characteristic diagram illustrating a detection concept of the first detection method for an abnormal value. In FIG. 7, the horizontal axis shows the frequency of the observation signal, and the vertical axis shows the spectral intensity.

In the first detection method, the abnormal value detection unit 211 detects an abnormal value by using a spectrum setting region ZRn. The spectrum setting region ZRn is obtained by setting a range in which a normal spectral intensity can be obtained in the frequency band of the observation signal. The spectrum setting region ZRn can be set by referring to, for example, past measurement results obtained in a state where there is no noise for water vapor observation, simulations, etc.

The abnormal value detection unit 211 determines whether the spectral intensity of each frequency is abnormal or normal according to whether the spectral intensity is within the spectrum setting region ZRn. More specifically, the abnormal value detection unit 211 acquires the normal range of the spectral intensity of the frequency to be determined from the spectrum setting region ZRn. If the spectral intensity of the observation signal is outside the normal range, the abnormal value detection unit 211 detects that the spectral intensity is an abnormal value.

For example, in the example of FIG. 7, the abnormal value detection unit 211 acquires the normal range ZNna of the observation frequency fa from the spectrum setting region ZRn. The abnormal value detection unit 211 detects the spectral intensity Dfa of the observation frequency fa in the observation signal. The abnormal value detection unit 211 detects that the spectral intensity Dfa is an abnormal value by detecting that the spectral intensity Dfa is outside the normal range ZNna. Then, the accuracy degraded frequency selecting unit 212 detects that the observation frequency fa is the accuracy degraded frequency.

Second Detection Method

Figure 8:
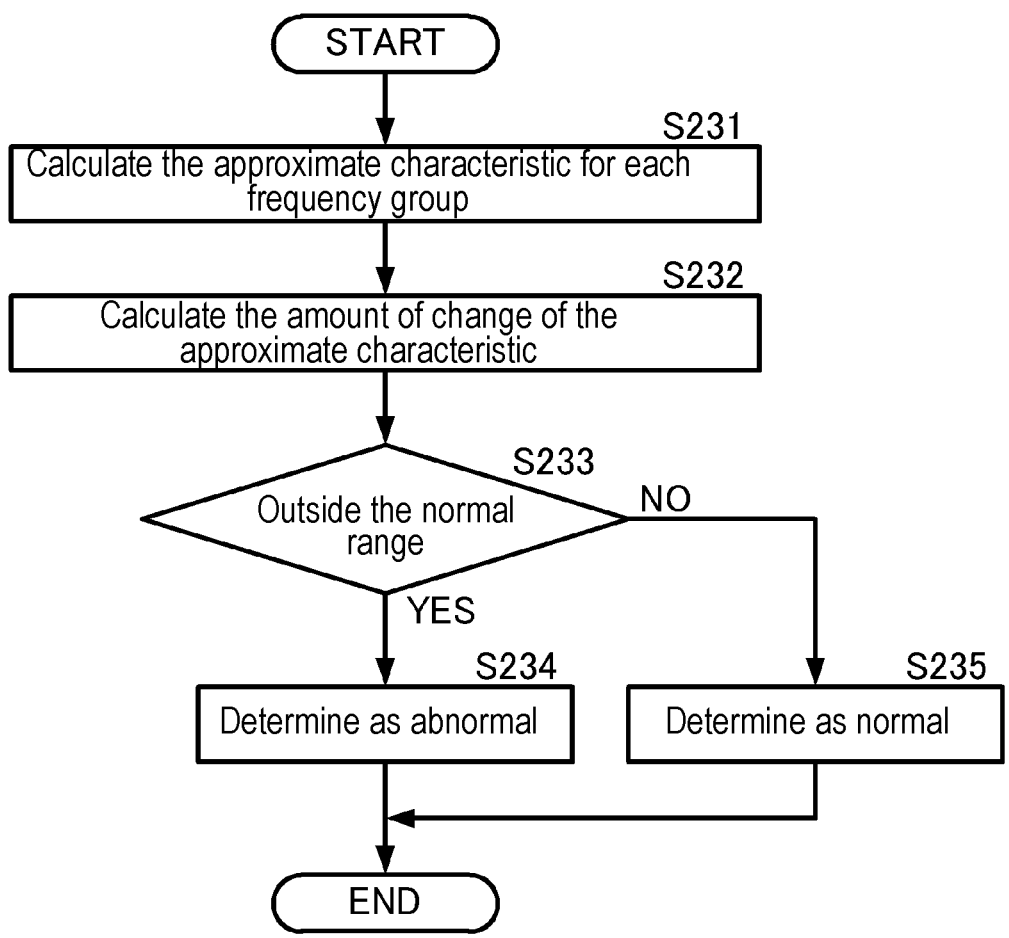
FIG. 8 is a flowchart showing the second detection method for an abnormal value.
Figure 9:
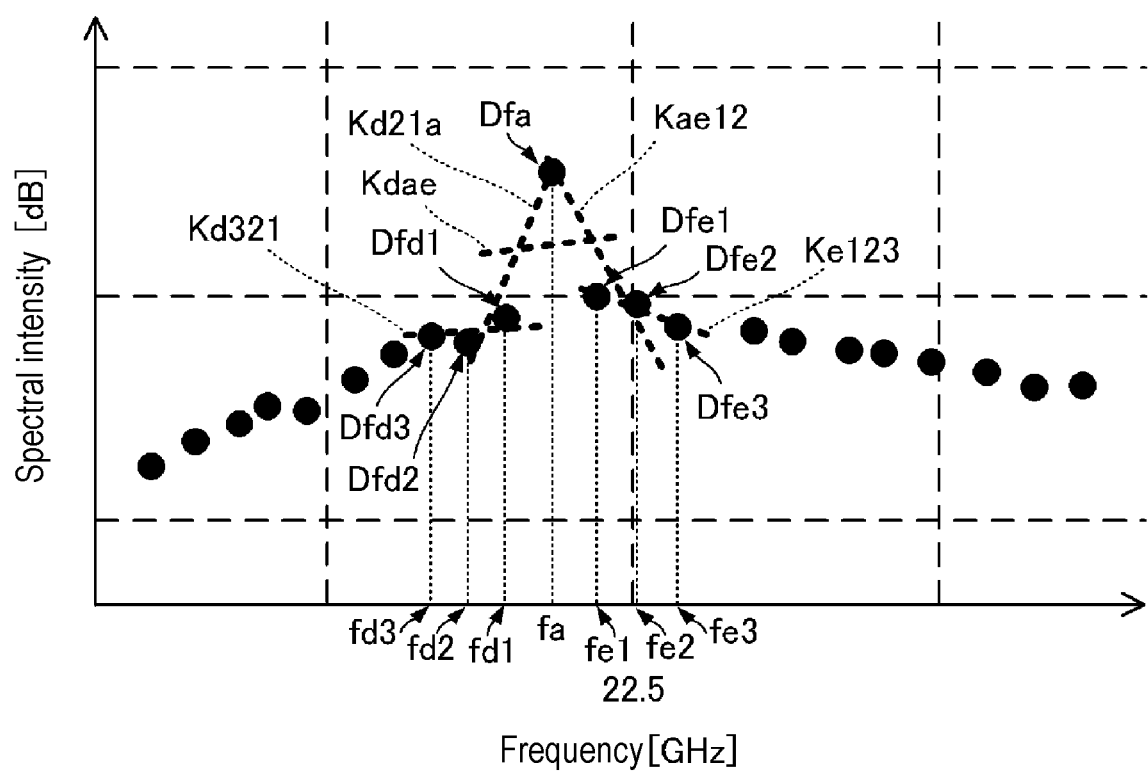
FIG. 9 shows the frequency of the observation signal on the horizontal axis and the spectral intensity on the vertical axis.

FIG. 8 is a flowchart showing the second detection method for an abnormal value. FIG. 9 is a spectral characteristic diagram illustrating the detection concept of the second detection method for an abnormal value. In FIG. 9, the horizontal axis shows the frequency of the observation signal, and the vertical axis shows the spectral intensity.

In the second detection method, the abnormal value detection unit 211 detects an abnormal value by using an approximate characteristic of the spectral intensity. The approximate characteristic is set by a coefficient of an approximate function calculated by using the spectral intensities at a plurality of frequencies arranged on the frequency axis. The approximate function may be a linear function, a quadratic function, etc., but the linear function reduces the calculation load.

The abnormal value detection unit 211 shifts a plurality of frequency groups for calculating approximate characteristics on the frequency axis, and calculates the approximate characteristic for each frequency group (S231). The abnormal value detection unit 211 calculates the amount of change in the approximate characteristic along the frequency axis (S232).

The abnormal value detection unit 211 sets a threshold value for the amount of change in advance. If the amount of change is equal to or greater than the threshold value, the abnormal value detection unit 211 determines that the spectral intensity is outside the normal range (S233: YES) and determines the spectral intensity as abnormal (S234). If the amount of change is equal to or less than the threshold value, the abnormal value detection unit 211 determines that the spectral intensity is within the normal range (S233: NO) and determines the spectral intensity as normal (S235).

For example, in the example of FIG. 9, the abnormal value detection unit 211 approximates the spectral intensities of the frequencies fd3, fd2, and fd1 arranged on the frequency axis with a linear function, and sets the coefficient thereof as the approximate characteristic Kd321. The abnormal value detection unit 211 approximates the spectral intensities of the frequencies fd2, fd1, and fa arranged on the frequency axis with a linear function, and sets the coefficient thereof as the approximate characteristic Kd21a. The abnormal value detection unit 211 approximates the spectral intensities of the frequencies fd1, fa, and fe1 arranged on the frequency axis with a linear function, and sets the coefficient thereof as the approximate characteristic Kdae. The abnormal value detection unit 211 approximates the spectral intensities of the frequencies fa, fe1, and fe2 arranged on the frequency axis with a linear function, and sets the coefficient thereof as the approximate characteristic Kae12. The abnormal value detection unit 211 approximates the spectral intensities of the frequencies fe1, fe2, and fe3 arranged on the frequency axis with a linear function, and sets the coefficient thereof as the approximate characteristic Ke123.

Next, the abnormal value detection unit 211 calculates the amount of change between the approximate characteristics adjacent to each other on the frequency axis. For example, the abnormal value detection unit 211 calculates the amount of change between the approximate characteristic Kd321 and the approximate characteristic Kd21a, and calculates the amount of change between the approximate characteristic Kd21a and the approximate characteristic Kdee. The abnormal value detection unit 211 calculates the amount of change between the approximate characteristic Kdae and the approximate characteristic Kae12, and calculates the amount of change between the approximate characteristic Kae12 and the approximate characteristic Ke123.

Here, as shown in FIG. 9, when an abnormal value (spectral intensity Dfa) is included, the approximate characteristic including the spectral intensity Dfa changes greatly with respect to the approximate characteristics before and after it. Therefore, if a threshold value is set for the amount of change and the amount of change is detected to be equal to or greater than the threshold value, the abnormal value detection unit 211 can detect the abnormal value.

For example, in the case of FIG. 9, the approximate characteristic including the spectral intensity Dfa, which is an abnormal value, changes greatly as compared with the approximate characteristic not including the spectral intensity Dfa. Therefore, the abnormal value detection unit 211 can detect this to determine and detect that the spectral intensity Dfa is an abnormal value. Then, the accuracy degraded frequency selecting unit 212 detects that the observation frequency fa having the abnormal value is the accuracy degraded frequency.

Third Detection Method

Figure 10:
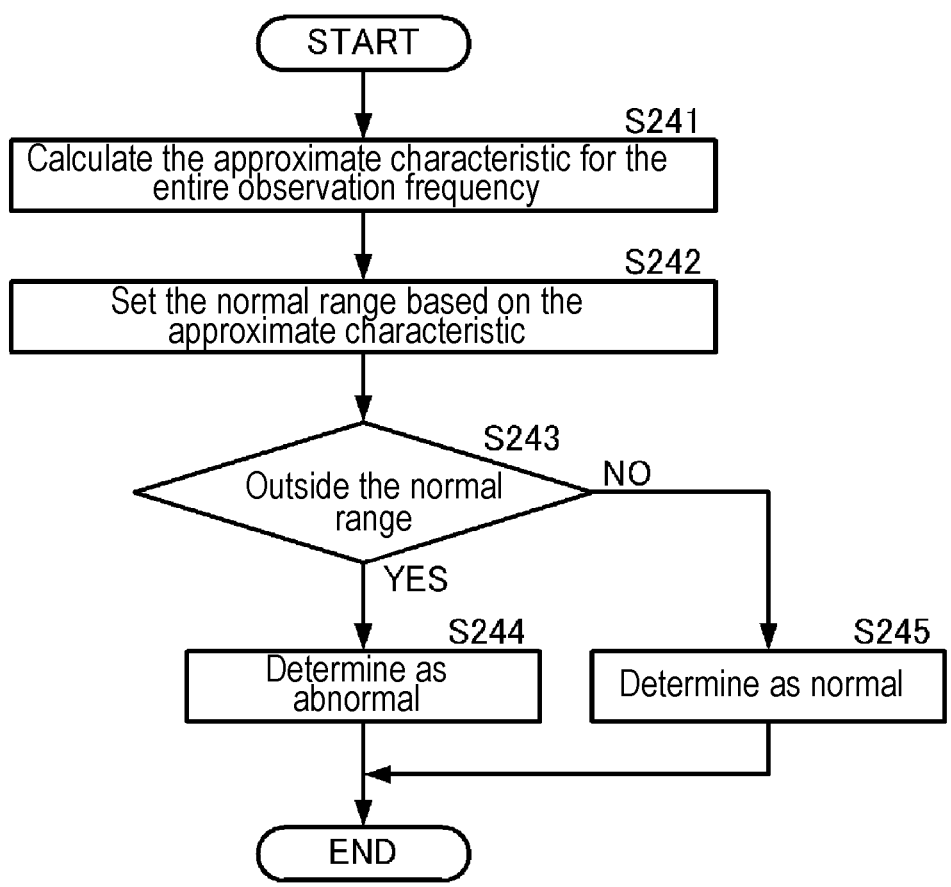
FIG. 10 is a flowchart showing the third detection method for an abnormal value.
Figure 11:
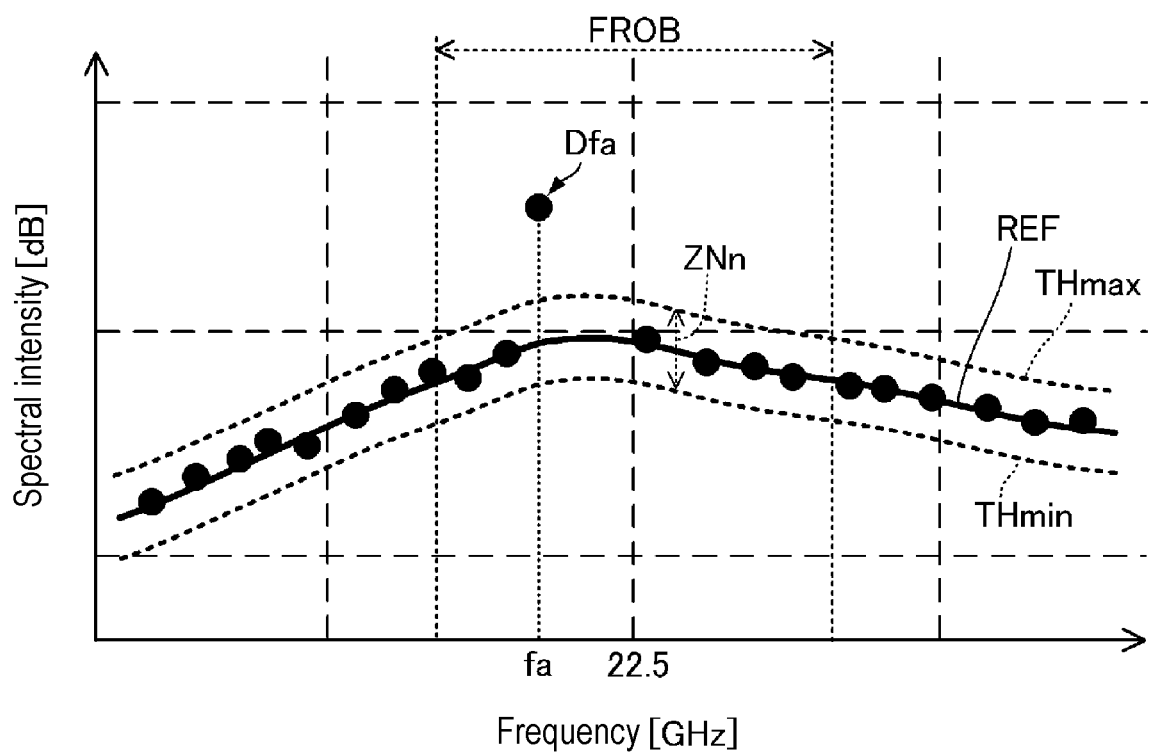
FIG. 11 is a spectral characteristic diagram illustrating the detection concept of the third detection method for an abnormal value.

FIG. 10 is a flowchart showing the third detection method for an abnormal value. FIG. 11 is a spectral characteristic diagram illustrating the detection concept of the third detection method for an abnormal value. In FIG. 11, the horizontal axis shows the frequency of the observation signal, and the vertical axis shows the spectral intensity.

In the third detection method, as in the second detection method, the abnormal value detection unit 211 detects an abnormal value by using the approximate characteristic of the spectral intensity. However, in the third detection method, the abnormal value detection unit 211 calculates the approximate characteristic from the spectral intensity of the entire frequency band of the observation frequency. In this case, the approximate function showing the approximate characteristic is set by a particular function or the like whose waveform is similar to the water vapor spectrum. This function can be appropriately set from, for example, past observation results of water vapor.

The abnormal value detection unit 211 calculates the approximate characteristic from the spectral intensity of the entire frequency band of the observation frequency (S241). The abnormal value detection unit 211 sets a normal range in which an observation error is added to the spectral intensity (estimated spectral intensity) of each frequency of the approximate characteristic (S242).

If the spectral intensity is outside the normal range (S243: YES), the abnormal value detection unit 211 determines the spectral intensity as abnormal (S244). If the spectral intensity is within the normal range (S243: NO), the abnormal value detection unit 211 determines the spectral intensity as normal (S245).

For example, in the example of FIG. 11, the abnormal value detection unit 211 calculates the approximate characteristic REF from the spectral intensity of the entire frequency band of the observation frequency.

Next, the abnormal value detection unit 211 sets an upper limit threshold value THmax and a lower limit threshold value THmin for the approximate characteristic REF. The abnormal value detection unit 211 sets the intensity range between the upper limit threshold value THmax and the lower limit threshold value THmin to the normal range ZNn. The abnormal value detection unit 211 compares the spectral intensity with the normal range ZNn for each observation frequency.

Here, as shown in FIG. 11, at the observation frequency fa, the spectral intensity Dfa is outside the normal range ZNn. Therefore, the abnormal value detection unit 211 can detect this to determine and detect that the spectral intensity Dfa is an abnormal value. Then, the accuracy degraded frequency selecting unit 212 detects that the observation frequency fa having the abnormal value is the accuracy degraded frequency.

For example, as shown in FIG. 11, the detection of such an abnormal value may be performed only in a particular frequency range FROB including the peak frequency of the water vapor spectrum or in the frequency range of a specific disturbing wave. As a result, the calculation load can be reduced without deteriorating the accuracy of water vapor observation. Such a selection of the frequency range FROB for determination can also be applied to the first and second detection methods.

Fourth Detection Method

Figure 12:
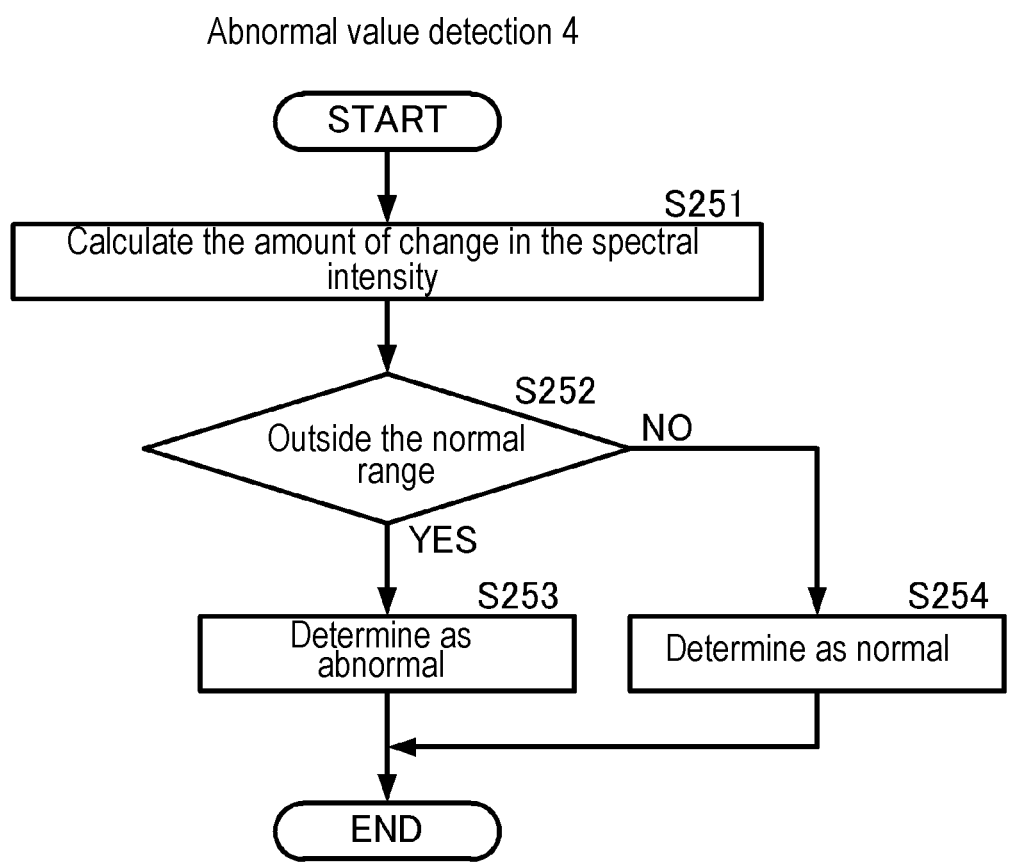
FIG. 12 is a flowchart showing the fourth detection method for an abnormal value.
Figure 13:
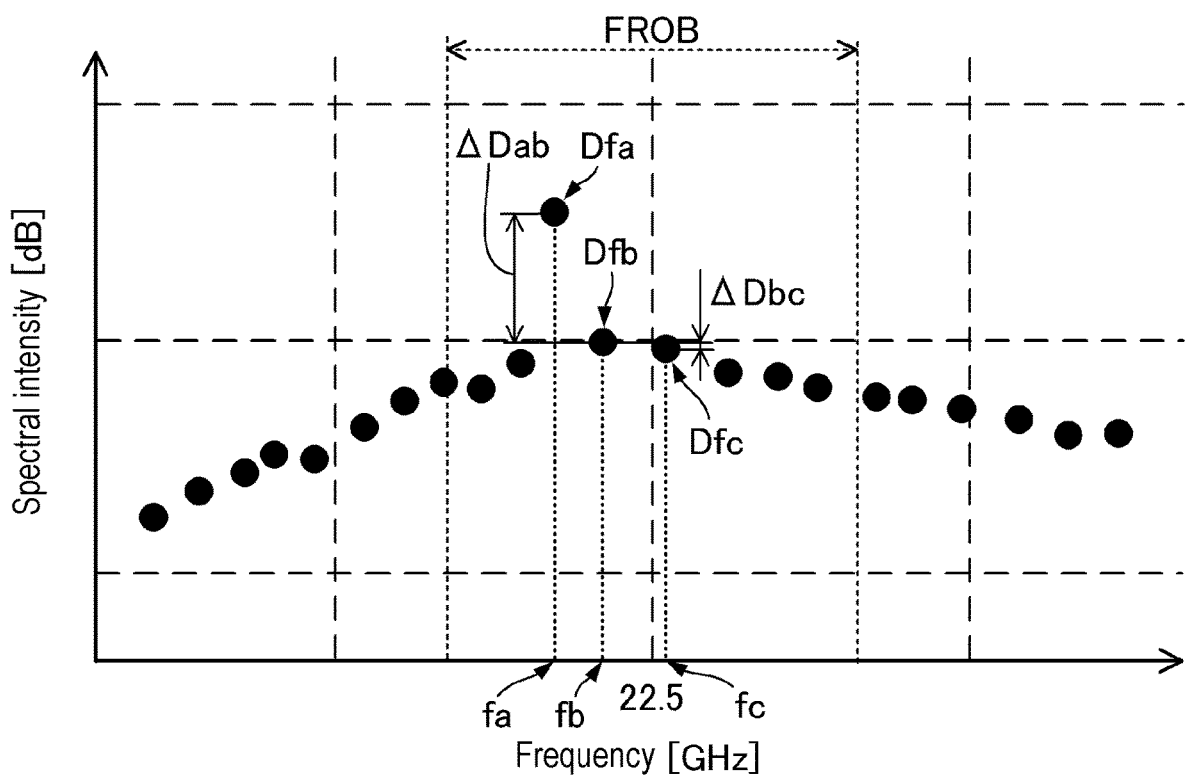
FIG. 13 is a spectral characteristic diagram illustrating the detection concept of the fourth detection method for an abnormal value.

FIG. 12 is a flowchart showing the fourth detection method for an abnormal value. FIG. 13 is a spectral characteristic diagram illustrating the detection concept of the fourth detection method for an abnormal value. In FIG. 13, the horizontal axis shows the frequency of the observation signal, and the vertical axis shows the spectral intensity.

In the fourth detection method, the abnormal value detection unit 211 detects an abnormal value by using a difference between the spectral intensities of adjacent frequencies.

The abnormal value detection unit 211 calculates the amount of change between the spectral intensities of adjacent frequencies (S251).

If the amount of change in the spectral intensity is outside the normal range (S252: YES), the abnormal value detection unit 211 determines the spectral intensity as abnormal (S253). If the amount of change in the spectral intensity is within the normal range (S252: NO), the abnormal value detection unit 211 determines the spectral intensity as normal (S254).

For example, in the example of FIG. 13, the abnormal value detection unit 211 calculates the amount of change ADab between the spectral intensity Dfa of the observation frequency fa and the spectral intensity Dfb of the observation frequency fb. The abnormal value detection unit 211 calculates the amount of change ADbc between the spectral intensity Dfb of the observation frequency fb and the spectral intensity Dfc of the observation frequency fc.

The abnormal value detection unit 211 sets a threshold value for the amount of change in advance. The threshold value is set based on the amount of change when there is no abnormal value, and can be appropriately set from past observation results, etc.

The abnormal value detection unit 211 detects that the amount of change ADab is greater than the threshold value, and detects that there is an abnormal value. Further, the abnormal value detection unit 211 detects that the amount of change ADbc is less than the threshold value, and detects that there is no abnormal value. From these results, the abnormal value detection unit 211 determines and detects that the spectral intensity Dfb of the observation frequency fb included in both amounts of change is not an abnormal value, but the spectral intensity Dfa of the observation frequency fa included only in the amount of change ADab is an abnormal value. Then, the accuracy degraded frequency selecting unit 212 detects that the observation frequency fa having the abnormal value is the accuracy degraded frequency.

For example, as shown in FIG. 13, the detection of such an abnormal value may be performed only in a particular frequency range including the peak frequency of the water vapor spectrum or in the frequency range of a specific disturbing wave. As a result, the calculation load can be reduced without deteriorating the accuracy of water vapor observation.

Fifth Detection Method

Figure 14:
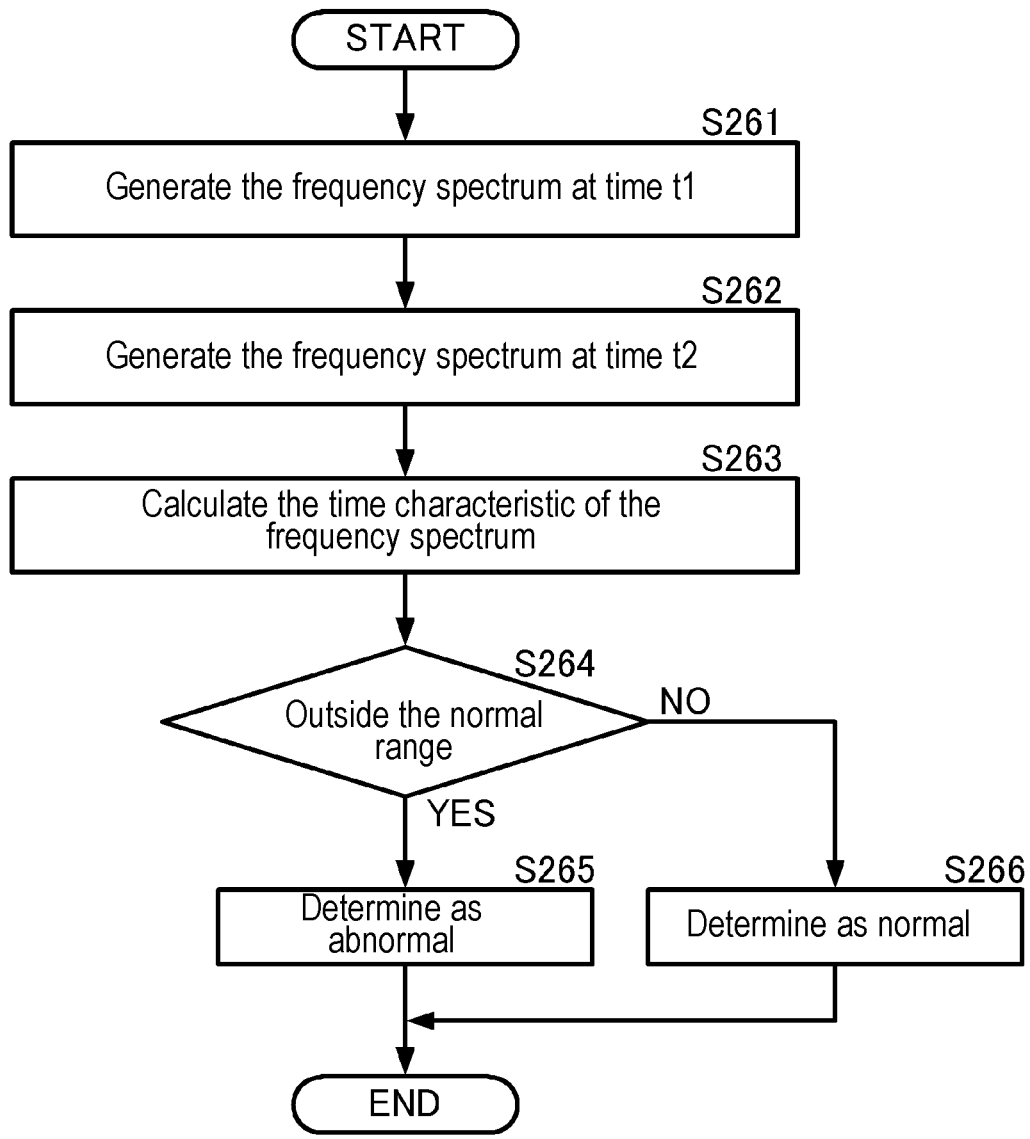
FIG. 14 is a flowchart showing the fifth detection method for an abnormal value.

FIG. 14 is a flowchart showing the fifth detection method for an abnormal value. (A) of FIG. 15 and (B) of FIG. 15 are spectral characteristic diagrams illustrating the detection concept of the fifth detection method for an abnormal value. (A) of FIG. 15 and (B) of FIG. 15 show spectral characteristics at different observation times. In (A) of FIG. 15 and (B) of FIG. 15, the horizontal axis shows the frequency of the observation signal, and the vertical axis shows the spectral intensity.

In the fifth detection method, the abnormal value detection unit 211 detects an abnormal value by using a time characteristic (an amount of change over time) of the spectral intensity.

The abnormal value detection unit 211 calculates the spectral intensity of each observation frequency at time t1 (S261). The abnormal value detection unit 211 calculates the spectral intensity of each observation frequency at time t2 (a time different from time t1) (S262).

The abnormal value detection unit 211 calculates the time characteristic of the frequency spectrum, specifically, the amount of change over time of the spectral intensity of each observation frequency (S263).

If the amount of change in the spectral intensity is outside the normal range (S264: YES), the abnormal value detection unit 211 determines the spectral intensity as abnormal (S265). If the amount of change in the spectral intensity is within the normal range (S264: NO), the abnormal value detection unit 211 determines the spectral intensity as normal (S266).

For example, in the example of FIG. 15, the abnormal value detection unit 211 calculates the amount of change over time between the spectral intensity Dfd(t1) of the observation frequency fd at time t1 and the spectral intensity Dfd(t2) of the observation frequency fd at time t2.

The abnormal value detection unit 211 sets a threshold value for the amount of change over time in advance. The threshold value is set based on the amount of change when there is no abnormal value, and can be appropriately set from past observation results, etc.

The abnormal value detection unit 211 detects that the amount of change over time of the observation frequency fd is greater than the threshold value, and detects that there is an abnormal value. Then, the accuracy degraded frequency selecting unit 212 detects that the observation frequency fd having the abnormal value is the accuracy degraded frequency.

Switching Method of the Observation Frequency

FIG. 16 is a flowchart showing a switching method of the observation frequency. FIG. 17 is a spectral characteristic diagram illustrating the concept of the switching method of the observation frequency. In the following, the observation frequency selecting unit 213 will be mainly described, but when the switching process is programmed for the observation frequency, the calculation processing device executes this process.

When the observation frequency that has been used for water vapor observation so far, that is, the observation frequency that has been given to the water vapor index calculation unit 22, is detected as the accuracy degraded frequency (S31: YES), the observation frequency selecting unit 213 selects the adjacent frequency (one frequency of the frequency spectrum) as a new observation frequency (S32). At this time, if the adjacent frequency is also determined as the accuracy degraded frequency, the observation frequency selecting unit 213 selects the further adjacent frequency as a new observation frequency.

For example, in the example of FIG. 17, the spectral intensity Dfa of the observation frequency fa is an abnormal value, and the accuracy degraded frequency selecting unit 212 selects the observation frequency fa as the accuracy degraded frequency. The observation frequency selecting unit 213 selects the frequency fb adjacent to the observation frequency fa as a new observation frequency. When such processing is performed, an error in the water vapor index may occur due to the switching of the observation frequency. However, the magnitude of the error can be made sufficiently small as compared with an error that occurs when an abnormal value is used. Therefore, the water vapor observation device 10 can suppress accuracy degradation and calculate the water vapor index.

In the above description, the frequency on the higher frequency side than the accuracy degraded frequency is selected as the new observation frequency, but the frequency on the low frequency side may be selected as the new observation frequency. Further, the frequency to be switched may not be adjacent to the accuracy degraded frequency and may be a frequency close to the accuracy degraded frequency.

Interpolation Method of the Spectral Intensity of the Observation Frequency

FIG. 18 is a flowchart showing the interpolation method of the spectral intensity of the observation frequency. FIG. 19 is a spectral characteristic diagram illustrating the concept of the interpolation method of the spectral intensity of the observation frequency. In the following, the observation frequency selecting unit 213 and the water vapor index calculation unit 22 will be mainly described, but when the switching process is programmed for the observation frequency, the calculation processing device executes this process.

When the observation frequency that has been used for water vapor observation so far, that is, the observation frequency that has been given to the water vapor index calculation unit 22, is detected as the accuracy degraded frequency (S41: YES), the observation frequency selecting unit 213 selects the adjacent frequencies (one frequency of the frequency spectrum) on both sides on the frequency axis as interpolation frequencies (S42). At this time, if the adjacent frequency is also determined as the accuracy degraded frequency, the observation frequency selecting unit 213 selects the further adjacent frequency as the interpolation frequency.

The water vapor index calculation unit 22 detects the spectral intensity of the observation frequency for interpolation, and calculates the spectral intensity of the original observation frequency (observation frequency determined as the accuracy degraded frequency) from the spectral intensity of the interpolation frequency (S43).

For example, in the example of FIG. 19, the spectral intensity Dfa of the observation frequency fa is an abnormal value, and the accuracy degraded frequency selecting unit 212 selects the observation frequency fa as the accuracy degraded frequency. The observation frequency selecting unit 213 selects the frequencies fb1 and fb2 adjacent to the observation frequency fa on both sides as the interpolation frequencies.

The water vapor index calculation unit 22 detects the spectral intensity Dfb1 of the interpolation frequency fb1 and the spectral intensity Dfb2 of the interpolation frequency fb2. The water vapor index calculation unit 22 calculates the interpolation spectral intensity Dfac of the observation frequency fa from the spectral intensity Dfb1 and the spectral intensity Dfb2. Specifically, for example, the water vapor index calculation unit 22 calculates the interpolation spectral intensity Dfac based on a weighted average value or the like according to a frequency separation amount (sampling frequency or the like).

By performing such processing, the water vapor observation device 10 can accurately calculate the water vapor index without changing the apparent observation frequency.

Second Embodiment

In each of the above-mentioned methods, the accuracy degraded frequency is selected after actually generating the spectrum of the observation frequency. However, by using the following configuration and method, the accuracy degraded frequency can be selected without generating the spectrum of the observation frequency.

Configuration of the Water Vapor Observation System (A) of FIG. 20 is a functional block diagram showing the configuration of a water vapor observation device in a water vapor observation system according to the second embodiment of the disclosure. (B) of FIG. 20 is a functional block diagram showing the configuration of an observation frequency selecting device of the water vapor observation system according to the second embodiment of the disclosure.

The water vapor observation system includes a water vapor observation device 10A shown in (A) of FIG. 20, and an observation frequency selecting device shown in (B) of FIG. 20.

As shown in (A) of FIG. 20, the water vapor observation device 10A according to the second embodiment includes a calculation unit 20A, an RF amplifier 30, an antenna 40, and an input unit 50. The calculation unit 20A includes a water vapor index calculation unit 22 and an intermediate signal processing unit 23. The RF amplifier 30, the antenna 40, the water vapor index calculation unit 22, and the intermediate signal processing unit 23 are the same as those of the water vapor observation device 10 according to the first embodiment, and the description of the same parts will be omitted.

The input unit 50 receives an input of an observation frequency selected by the observation frequency selecting device 60 described later. The input unit 50 outputs the input observation frequency to the water vapor index calculation unit 22. The water vapor index calculation unit 22 calculates a water vapor index by using the observation frequency.

As shown in (B) of FIG. 20, the observation frequency selecting device 60 includes an NF characteristic measurement unit 61 and a frequency selecting unit 62.

The NF characteristic measurement unit 61 is composed of, for example, an NF meter or the like. The NF characteristic measurement unit 61 measures the NF characteristic of the RF amplifier 30. The NF characteristic measurement unit 61 outputs the measurement result of the NF characteristic to the frequency selecting unit 62.

The frequency selecting unit 62 selects a plurality of observation frequencies excluding the accuracy degraded frequency by using the measurement result of the NF characteristic.

FIG. 21 is a graph showing an example of the NF characteristic of the RF amplifier. Generally, as shown in FIG. 21, the RF amplifier such as an LNA has a frequency band BFex where NF is high and a frequency band BFad where NF is low.

The signal intensity of radio waves generated by water vapor is weak, and the influence of the NF is large, which greatly affects the calculation error of the water vapor index.

The frequency selecting unit 62 selects the frequency band BFex where NF is high as the frequency band of the accuracy degraded frequency. The frequency selecting unit 62 selects a plurality of observation frequencies so as to exclude the frequency band of the accuracy degraded frequency. For example, the frequency selecting unit 62 selects a plurality of observation frequencies in the frequency band BFad where NF is low.

By performing such a configuration and processing, a plurality of observation frequencies selected to exclude the frequency band of the accuracy degraded frequency are input to the water vapor index calculation unit 22. Therefore, the water vapor index calculation unit 22 can accurately calculate the water vapor index. Furthermore, since a plurality of observation frequencies are selected within the frequency band BFad where NF is low, that is, within a frequency band in which a highly accurate spectral intensity can be obtained, the water vapor index calculation unit 22 can calculate the water vapor index more accurately.

Water Vapor Observation Method According to the Second Embodiment

In the above description, a mode is shown in which the processes of water vapor observation are respectively executed by functional units for different processes. However, the processing in the water vapor observation system described above may be programmed and stored in a storage medium or the like, and the program may be executed by the calculation processing device to realize the above-mentioned water vapor observation. In this case, the calculation processing device may execute the processing according to the flowcharts shown in FIG. 22 and FIG. 23, for example. FIG. 22 is a flowchart of an accuracy degraded frequency process. FIG. 23 is a flowchart of a water vapor observation process.

As shown in FIG. 22, the calculation processing device measures the NF characteristic of the LNA (RF amplifier) (S51). The calculation processing device selects the frequency band where NF is high as the frequency band of the accuracy degraded frequency (S52).

As shown in FIG. 23, the calculation processing device detects a high-accuracy frequency band in the vicinity of the peak frequency of the spectral intensity of the water vapor index (S61). The peak frequency of the spectral intensity of the water vapor index can be detected from the frequency spectrum of water vapor acquired in the past. Further, the high-accuracy frequency band can be acquired from the NF characteristic, and is a frequency band different from the frequency band of the accuracy degraded frequency.

The calculation processing device selects the observation frequency in the vicinity of the peak frequency in the high-accuracy frequency band (S62).

The calculation processing device selects at least one observation frequency in addition to the observation frequency in the vicinity of the peak frequency. Then, the calculation processing device detects the spectral intensities of these plurality of observation frequencies (S63).

The calculation processing device calculates the water vapor index from the spectral intensities of these plurality of observation frequencies (S64).

By such processing, the calculation processing device can accurately calculate the water vapor index. In addition, if the observation frequency is selected by excluding the frequency band of the accuracy degraded frequency, the calculation processing device can calculate the water vapor index accurately, and even if the observation frequency is selected as a frequency away from the peak frequency, the calculation processing device can calculate the water vapor index with a particular accuracy.

However, the calculation processing device can calculate the water vapor index more accurately by selecting the observation frequency in the high-accuracy frequency band, and can calculate the water vapor index even more accurately by selecting the observation frequency in the vicinity of the peak frequency.

Third Embodiment

In the first embodiment described above, the water vapor observation including calculation of the water vapor index is performed by a single water vapor observation device. However, a data communication network can be used to configure a water vapor observation system similar to the water vapor observation device according to the first embodiment.

FIG. 24 is a functional block diagram showing the configuration of the water vapor observation system according to the third embodiment.

As shown in FIG. 24, the water vapor observation system 1B includes a water vapor observation device 10B and an information processing device 80. The water vapor observation device 10B and the information processing device 80 are connected via a data communication network 90. The information processing device 80 can be realized by, for example, a personal computer or the like. The data communication network 90 can be realized by the Internet, LAN or the like.

The water vapor observation device 10B includes a calculation unit 20B, an RF amplifier 30, an antenna 40, and a transceiving unit 70. The calculation unit 20B includes a water vapor index calculation unit 22 and an intermediate signal processing unit 23. The transceiving unit 70 is connected to the water vapor index calculation unit 22. The transceiving unit 70 has an interface function of the water vapor observation device 10B for the data communication network 90.

The information processing device 80 includes a CPU 81, a storage unit 82, a transceiving unit 83, a display unit 84, and an operation unit 85. The CPU 81, the storage unit 82, the transceiving unit 83, the display unit 84, and the operation unit 85 are connected by a data bus.

The CPU 81 executes each process by executing a program stored in the storage unit 82. For example, the CPU 81 functions as a frequency selecting unit 811 by executing a frequency selecting program stored in the storage unit 82. The frequency selecting unit 811 performs the same processing as the frequency selecting unit 21 described above. Further, the CPU 81 functions as a water vapor observation unit 812 by executing a water vapor observation program stored in the storage unit. The water vapor observation unit 812 calculates the water vapor index and observes the amount of water vapor, etc.

The storage unit 82 stores various programs executed by the CPU 81, and also stores the water vapor index from the water vapor observation device 10B. The storage unit 82 may be external to the information processing device 80, and may be in a form (for example, a server, or the like) connected to the data communication network 90.

The transceiving unit 83 has an interface function of the information processing device 80 for the data communication network 90. The display unit 84 is realized by a liquid crystal display, or the like, and can display the water vapor observation result, the water vapor index, the frequency spectrum of the observation signal, etc. The operation unit 85 is realized by a keyboard, a mouse, a touch panel, or the like, and receives an operation input related to water vapor observation.

Even with such a configuration, the water vapor observation system 1B can achieve the same effect as the water vapor observation device 10 described above.

Fourth Embodiment

The water vapor observation system according to the fourth embodiment is different from the observation system according to the third embodiment in that the water vapor index is calculated on the information processing device side. Other configurations of the water vapor observation system according to the fourth embodiment are the same as those of the water vapor observation system according to the third embodiment, and the description of the same parts will be omitted.

FIG. 25 is a functional block diagram showing the configuration of the water vapor observation system according to the fourth embodiment.

As shown in FIG. 25, the water vapor observation system 1C includes a water vapor observation device 10C and an information processing device 80C. The water vapor observation device 10C and the information processing device 80C are connected via a data communication network 90.

The water vapor observation device 10C includes a calculation unit 20C. The calculation unit 20C includes a frequency spectrum generation unit 24 and an intermediate signal processing unit 23. The frequency spectrum generation unit 24 generates the frequency spectrum of the observation signal. The frequency spectrum generation unit 24 transmits the generated frequency spectrum to the information processing device 80C via a transceiving unit 70 and the data communication network 90.

The information processing device 80C includes a CPU 81C. The CPU 81C functions as a water vapor index calculation unit 810 by executing a water vapor index calculation program stored in the storage unit in addition to the processing of the CPU 81 according to the third embodiment. The water vapor index calculation unit 810 is the same as the water vapor index calculation unit 22 described above, and calculates the water vapor index from the spectral intensities of a plurality of observation frequencies.

Even with such a configuration, the water vapor observation system 1C can achieve the same effect as the water vapor observation device 10 described above.

Further, it is also possible to configure the calculation unit of the water vapor observation device only with the intermediate signal processing unit 23 and to provide the information processing device with the function of the frequency spectrum generation unit 24.

In addition, the configuration and processing of each embodiment described above can be appropriately combined, and it is possible to achieve the effect according to each combination.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface". The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately", "about", and "substantially" as used herein include the recited numbers, and also represent an amount close to the stated amount that still performs a desired function or achieves a desired result. For example, the terms "approximately", "about", and "substantially" may refer to an amount that is within less than 10% of the stated amount. Features of embodiments disclosed herein preceded by a term such as "approximately", "about", and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A water vapor observation device, comprising:
   an antenna configured to receive radio waves radiated from an atmosphere including water vapor;
   an RF amplifier configured to amplify the radio waves received and generate an observation signal; and
   processing circuitry configured to:
   select a plurality of observation frequencies by excluding an accuracy degraded frequency based on the observation signal; and
   calculate a water vapor index by using spectral intensities of the plurality of observation frequencies.

2. The water vapor observation device according to claim 1, wherein the processing circuitry is further configured to:
   detect an abnormal value in a frequency spectrum of the observation signal;
   select a frequency of the abnormal value as the accuracy degraded frequency; and
   select the plurality of observation frequencies by excluding the accuracy degraded frequency.

3. The water vapor observation device according to claim 2, wherein the processing circuitry is further configured to:
   set a normal range of a spectral intensity for each frequency, and
   detect the abnormal value from the spectral intensity of each frequency in which the spectral intensity is outside the normal range.

4. The water vapor observation device according to claim 3, wherein the processing circuitry is further configured to:
   detect the abnormal value by using an approximate frequency characteristic based on spectral intensities of a plurality of frequencies arranged on a frequency axis of the frequency spectrum.

5. The water vapor observation device according to claim 4, wherein the processing circuitry is further configured to:
   detect the abnormal value by using the approximate frequency characteristic calculated from spectral intensities of two adjacent frequencies on the frequency axis.

6. The water vapor observation device according to claim 5, wherein the processing circuitry is further configured to:
   set a normal range for each frequency based on the approximate frequency characteristic, and
   detect the abnormal value from a spectral intensity of a frequency in which the spectral intensity is outside the normal range of each frequency.

7. The water vapor observation device according to claim 6, wherein the processing circuitry is further configured to:
   detect the abnormal value from based on a difference between spectral intensities of adjacent frequencies arranged on the frequency axis of the frequency spectrum.

8. The water vapor observation device according to claim 7, wherein the processing circuitry is further configured to:
   detect the abnormal value based on a change over time of the frequency spectrum.

9. The water vapor observation device according to claim 8, wherein the processing circuitry is further configured to:

select a frequency adjacent to the accuracy degraded frequency in the frequency spectrum of the observation signal as at least one of the plurality of observation frequencies.

10. The water vapor observation device according to claim 9, wherein the processing circuitry is further configured to:
select two frequencies sandwiching the accuracy degraded frequency on the frequency axis as interpolation frequencies, and
calculate the spectral intensity of the observation frequency having the same frequency as the accuracy degraded frequency based on spectral intensities of the interpolation frequencies.

11. The water vapor observation device according to claim 2, wherein the processing circuitry is further configured to:
detect the abnormal value by using an approximate frequency characteristic based on spectral intensities of a plurality of frequencies arranged on a frequency axis of the frequency spectrum.

12. The water vapor observation device according to claim 4, wherein the processing circuitry is further configured to:
set a normal range for each frequency based on the approximate frequency characteristic, and
detect the abnormal value from a spectral intensity of a frequency in which the spectral intensity is outside the normal range of each frequency.

13. The water vapor observation device according to claim 2, wherein the processing circuitry is further configured to:
detect the abnormal value based on a difference between spectral intensities of adjacent frequencies arranged on the frequency axis of the frequency spectrum.

14. The water vapor observation device according to claim 2, wherein the processing circuitry is further configured to:
detect the abnormal value based on a change over time of the frequency spectrum.

15. The water vapor observation device according to claim 2, wherein the processing circuitry is further configured to:
select a frequency adjacent to the accuracy degraded frequency in the frequency spectrum of the observation signal as at least one of the plurality of observation frequencies.

16. The water vapor observation device according to claim 2, wherein the processing circuitry is further configured to:
select two frequencies sandwiching the accuracy degraded frequency on the frequency axis as interpolation frequencies, and
calculate the spectral intensity of the observation frequency having the same frequency as the accuracy degraded frequency based on spectral intensities of the interpolation frequencies.

17. A water vapor observation system, comprising:
the water vapor observation device according to claim 2, wherein the processing circuitry is programmed to at least measure an NF characteristic of the RF amplifier, and
the processing circuitry is programmed to at least select the plurality of observation frequencies by using a measurement result of the NF characteristic.

18. A water vapor observation system, comprising:
the water vapor observation device according to claim 10, wherein the processing circuitry is further configured to:
measure an NF characteristic of the RF amplifier, and
select the plurality of observation frequencies by using a measurement result of the NF characteristic.

19. A water vapor observation method, comprising:
receiving radio waves radiated from an atmosphere including water vapor;
amplifying the radio waves received and generating an observation signal;
selecting a plurality of observation frequencies by excluding an accuracy degraded frequency in the observation signal based on the observation signal; and
calculating a water vapor index by using spectral intensities of the plurality of observation frequencies.

20. A non-transient computer-readable recording medium, recording a water vapor observation program, causing a calculation processing device to execute processes of:
amplifying radio waves radiated from an atmosphere including water vapor;
generating an observation signal from the radio waves amplified;
selecting a plurality of observation frequencies by excluding an accuracy degraded frequency in the observation signal based on the observation signal; and
calculating a water vapor index by using spectral intensities of the plurality of observation frequencies.

* * * * *